MULTIPLYING AND DIVIDING MACHINE

Filed Sept. 22, 1948 14 Sheets-Sheet 1

Inventors
SAMUEL BRAND
F. VALLEE ADAMS
By William Lang
Attorney

Oct. 28, 1952 S. BRAND ET AL 2,615,624

MULTIPLYING AND DIVIDING MACHINE

Filed Sept. 22, 1948 14 Sheets-Sheet 2

Inventors
SAMUEL BRAND
F. VALLEE ADAMS

By William Lang
Attorney

Inventors
SAMUEL BRAND
F. VALLEE ADAMS
By
William Lang
Attorney

Inventors
SAMUEL BRAND
F. VALLEE ADAMS

By William Lang
Attorney

Oct. 28, 1952 S. BRAND ET AL 2,615,624

MULTIPLYING AND DIVIDING MACHINE

Filed Sept. 22, 1948 14 Sheets-Sheet 5

Inventors
SAMUEL BRAND
F. VALLEE ADAMS

By William Lang
Attorney

Inventors
SAMUEL BRAND
F. VALLEE ADAMS
By
William Lang
Attorney

INVENTORS
SAMUEL BRAND
F. VALLEE ADAMS
BY William Lang
ATTORNEY

69189777÷789 = 87693

INVENTORS
SAMUEL BRAND
F. VALLEE ADAMS
BY William Lang
ATTORNEY

MULTIPLYING AND DIVIDING MACHINE

Filed Sept. 22, 1948 14 Sheets-Sheet 9

DIVIDEND

| DIVISOR | 1 | 2 | 3 | 4 | 5 | 6 | 7 | 8 | 9 |
|---|---|---|---|---|---|---|---|---|---|
| 1 | 1 | 2 | 2 | 2 | 5 | 5 | 5 | 5 | 5 |
| 2 | .5 | 1 | 1 | 2 | 2 | 2 | 2 | 2 | 5 |
| 3 | .5 | .5 | 1 | 1 | 2 | 2 | 2 | 2 | 2 |
| 4 | .2 | .5 | 1 | 1 | 1 | 1 | 2 | 2 | 2 |
| 5 | .2 | .5 | .5 | 1 | 1 | 1 | 1 | 2 | 2 |
| 6 | .2 | .5 | .5 | .5 | 1 | 1 | 1 | 1 | 1 |
| 7 | .2 | .2 | .5 | .5 | .5 | 1 | 1 | 1 | 1 |
| 8 | .2 | .2 | .5 | .5 | .5 | 1 | 1 | 1 | 1 |
| 9 | .2 | .2 | .5 | .5 | .5 | .5 | 1 | 1 | 1 |

INVENTORS
SAMUEL BRAND
F. VALLEE ADAMS
BY William Lang
ATTORNEY

INVENTORS
SAMUEL BRAND
F. VALLEE ADAMS
BY William Lang
ATTORNEY

INVENTORS
SAMUEL BRAND
F. VALLEE ADAMS
BY William Lang
ATTORNEY

Oct. 28, 1952 S. BRAND ET AL 2,615,624

MULTIPLYING AND DIVIDING MACHINE

Filed Sept. 22, 1948 14 Sheets-Sheet 12

INVENTORS
SAMUEL BRAND
F. VALLEE ADAMS
BY
ATTORNEY

Oct. 28, 1952 S. BRAND ET AL 2,615,624

MULTIPLYING AND DIVIDING MACHINE

Filed Sept. 22, 1948 14 Sheets-Sheet 13

INVENTORS
SAMUEL BRAND
F. VALLEE ADAMS
BY William Lang
ATTORNEY

INVENTORS
SAMUEL BRAND
F. VALLEE ADAMS
BY William Lang
ATTORNEY

Patented Oct. 28, 1952 2,615,624

UNITED STATES PATENT OFFICE 2,615,624

MULTIPLYING AND DIVIDING MACHINE

Samuel Brand, Binghamton, and Francis V. Adams, Endicott, N. Y., assignors to International Business Machines Corporation, New York, N. Y., a corporation of New York Application September 22, 1948, Serial No. 50,574

21 Claims. (Cl. 235—61)

This invention relates to calculating machines of the electrically controlled type and more particularly to machines in which multiplying and dividing operations are carried out.

The principal object of the invention is to provide a multiplying-dividing machine in which common mechanism is employed to a great extent in carrying out both types of computation to the end that the structure of such machine is greatly simplified.

A more specific object of the invention is to provide a dividing mechanism in which a dividend is successively reduced by repeatedly subtracting multiples of the divisor employing only the multiples 2 times and 5 times the divisor and also 1 times the divisor. A comparing mechanism is provided which repeatedly compares the highest ordered divisor digit with the highest ordered dividend digit and selects 1, 2 or 5 as the multiple for the next subtraction.

In carrying out multiplication, a multiplier is successively reduced by subtracting 1, 2 or 5 from the highest order thereof. A testing mechanism repeatedly inspects the highest order of the multiplier and selects one of these digits with the procedure continuing until the multiplier is reduced to zero.

For dividing, a quotient accumulator is provided for summing the digits 1, 2 and 5, with appropriate denominational allocation until the capacity of the apparatus is reached, while for multiplying a product accumulator is provided for summing multiples of the divisor with appropriate denominational allocation until the multiplier is reduced to zero.

In both multiplying and dividing, when an overdraft occurs, the testing and comparing proceed nevertheless, but instead of a subtracting operation in accordance with the resulting selection, the digit 1, 2 or 5 (for multiplying) or 1, 2 or 5 times the divisor (for dividing) is added, followed by a further test continuing until the overdraft has been balanced, i. e., until the remainder changes from a negative value back to positive.

The accumulating mechanism employed in the machine is of the so-called cyclic type in which an amount may be entered during a so-called cycle of operation. The 2 and 5 times multiples are formed by means of a partial products forming device in which right and left hand components of partial products are separately obtained and successively entered into the accumulator during a single operating cycle.

A particular feature of the invention resides in the novel arrangement employing only the 1, 2 and 5 times multiples of the divisor and multiplier, and in the handling of the partial products so that right and left hand components are entered into the accumulator during a single cycle of operation.

A more specific object of the invention is to provide improved start and stop controls for a cyclically operable accumulator to enable the same to expeditiously receive 1, 2 or 5 times multiples of a factor or 9's complements thereof during a single cycle of operation.

A still further object of the invention is to provide improved column shift devices by which entries into the accumulators are controlled.

Another object resides in the provision of novel overdraft detecting devices which function prior to the completion of the entering that results in an overdraft and thereby anticipates the occurrence of such overdraft and conditions subsequent machine operations to the end that a saving of time is realized.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1*a*, 1*b*, 1*c*, 1*d*, 1*e*, and 1*f* taken together and arranged horizontally in the order named constitute a wiring diagram of the electric circuits of the machine.

Fig. 2 sets forth the mathematical procedure involved in carrying out a specific multiplying example.

Fig. 3 sets forth the procedure followed by the machine in carrying out the example of Fig. 2 indicating the successive settings of the accumulators involved.

Fig. 4 sets forth the mathematical procedure involved in carrying out a specific dividing example.

Fig. 5 sets forth the procedure followed by the machine in carrying out the example of Fig. 4 indicating the successive settings of the accumulators involved.

Fig. 6 sets forth the trial quotient digit selected for compared values of the divisor and dividend digits.

Figure 12A:
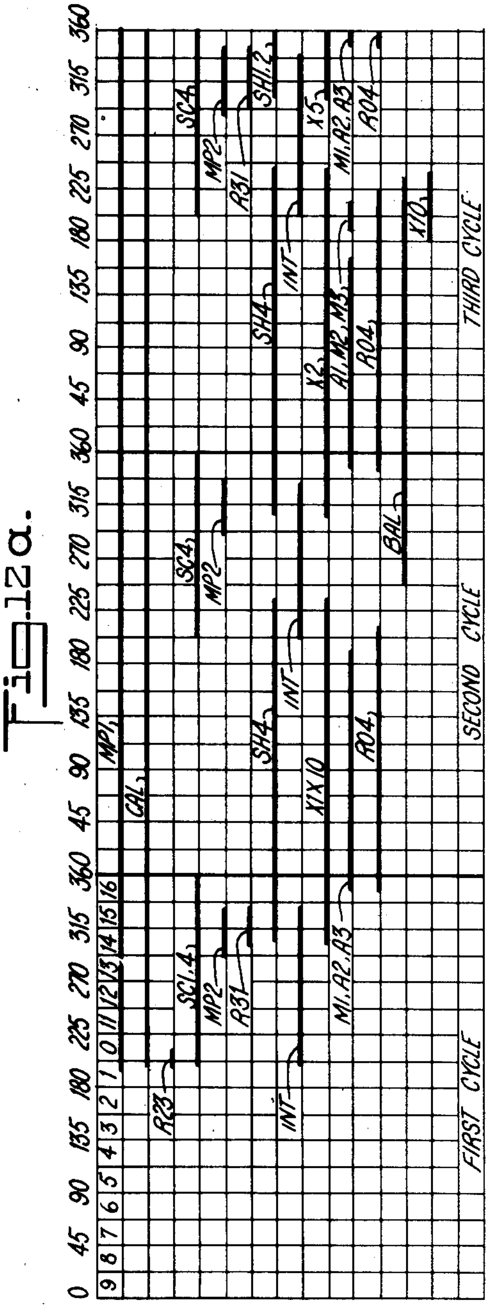
Figure 12B:
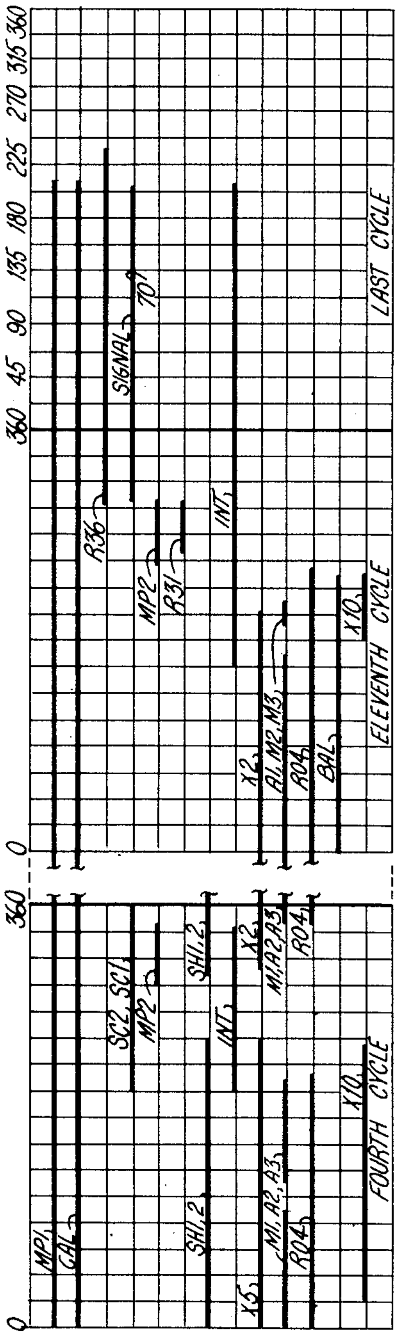

Figs. 12a and 12b taken together and arranged horizontally in the order named constitute a sequence diagram showing the relative periods of energization of several of the relays involved in the handling of a multiplying problem through a plurality of cycles.

Figure 13A:
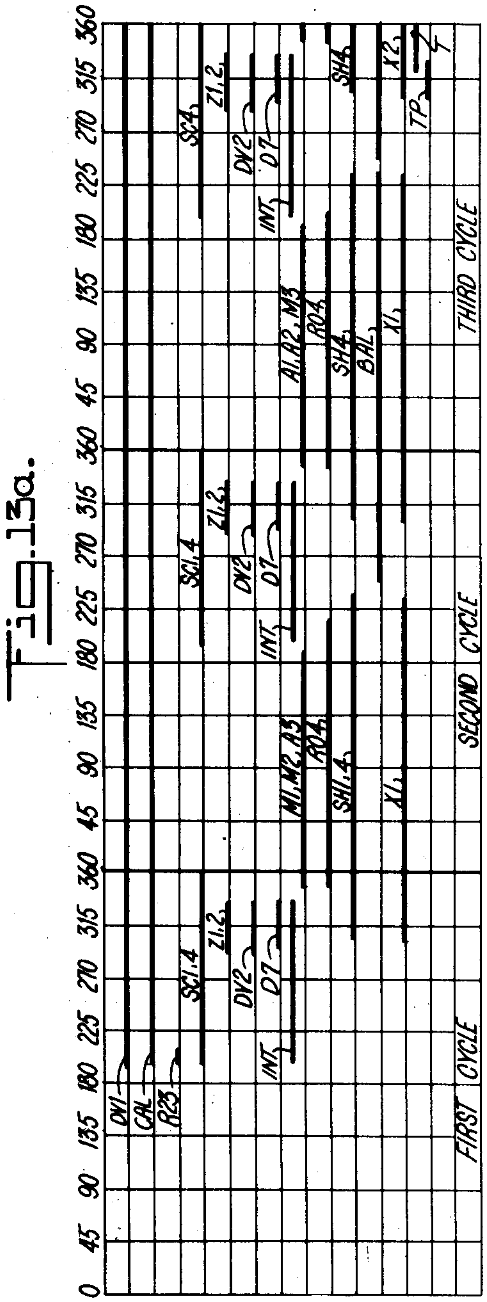
Figure 13B:
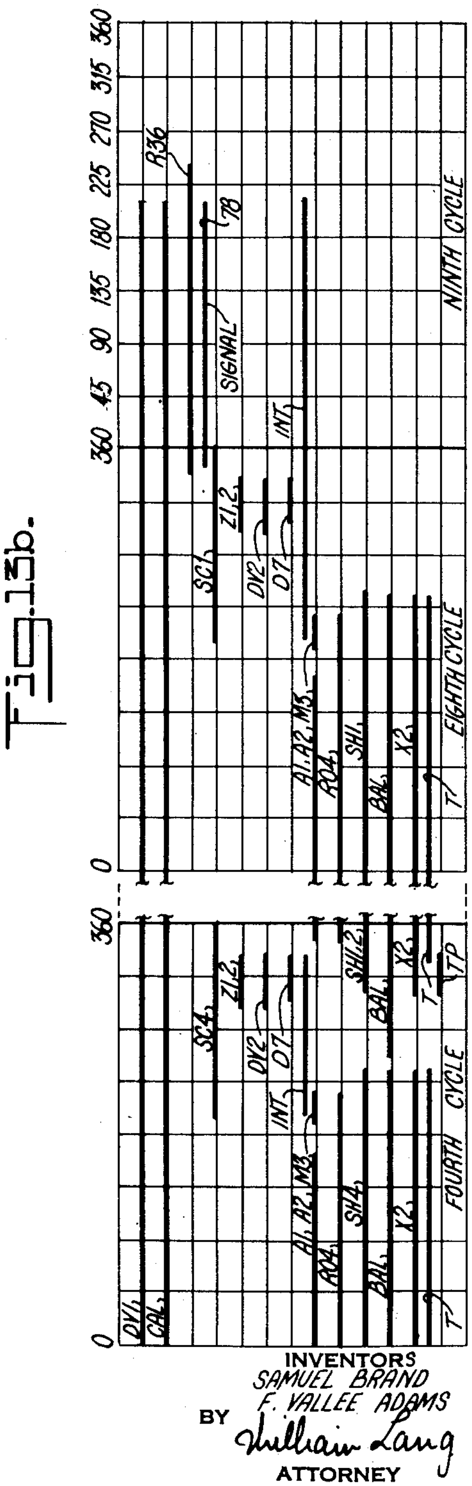

Figs. 13a and 13b taken together and arranged horizontally in the order named constitute a sequence diagram showing the relative periods of energization of several of the relays involved in the handling of a dividing problem through a plurality of cycles.

Figure 14:
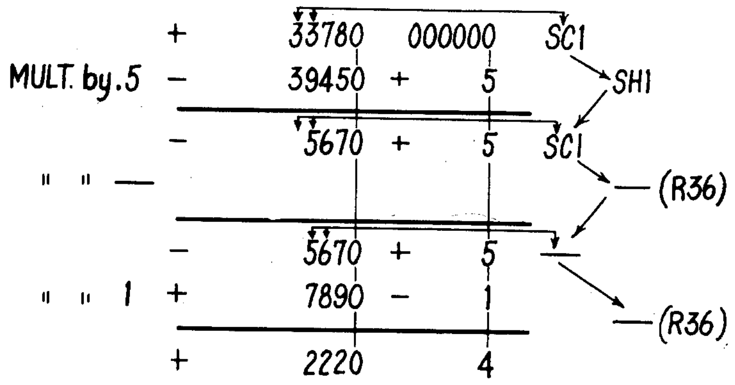
Figure 15:
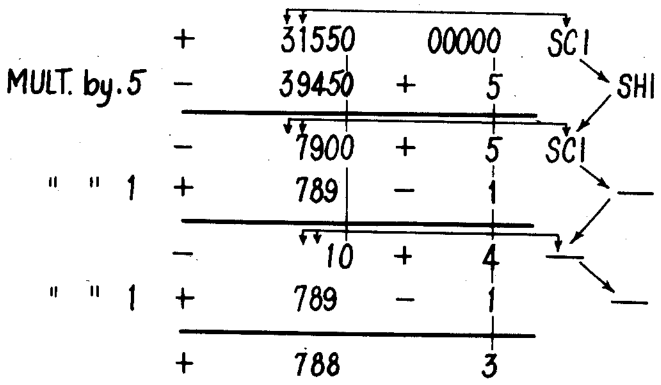

Figs. 14 and 15 are diagrams setting forth the mathematical procedure involved in dividing operations where remainders are involved.

*The accumulating mechanism*

Figures 6, 7:
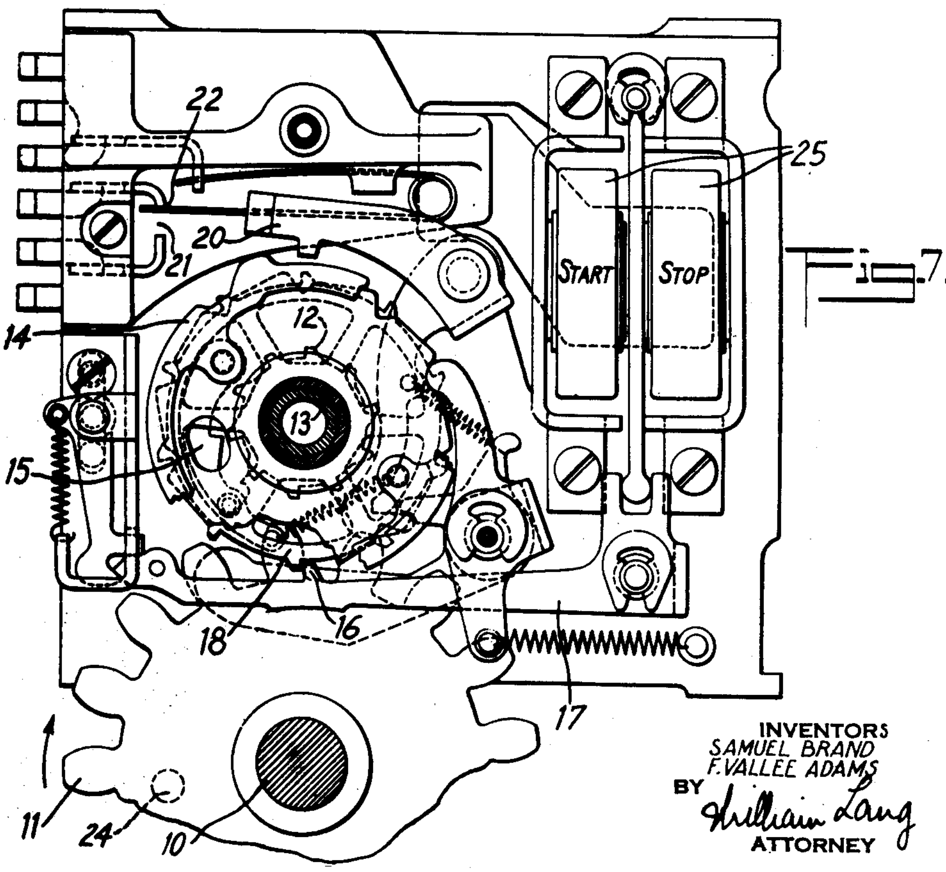
Fig. 7 is a view of one order of an accumulator.

The accumulating mechanism is of the well known type disclosed in the Lake et al. Patent 2,328,653, granted September 7, 1943, and one unit or order thereof is shown in Fig. 7. Its operation briefly is as follows.

A constantly rotating shaft 10 driven from a suitable source of power has secured thereto a gear 11 for each accumulating unit or order. This gear meshes with and drives a gear (not shown) integral with driving ratchet 12 freely rotatable on a stud 13. Also free on stud 13 is an element or wheel 14 to which is pivoted a dog 15 lying in the plane of ratchet 12 and normally held out of engagement therewith. As more fully explained in the patent referred to, this disagreement is maintained through the interception by a tooth 16 on a lever 17 of a disk 18. When lever 17 is rocked counterclockwise the disk 18 is released and, as a result, dog 15 engages ratchet 12 and is driven thereby together with accumulating element 14. At a selected point in the cycle, lever 17 is rocked back into intercepting position and effects uncoupling of the accumulating element. A cycle of operation, represented by a revolution of shaft 10, is divided into sixteen so-called cycle points designated as 9, 8, 7, 6, 5, 4, 3, 2, 1, 0, 11, 12, 13, 14, 15 and 16. To enter any significant digit, clutching is effected at the correspondingly numbered cycle point, and later declutching at the 0 cycle point will leave the accumulating element or wheel 14 advanced a corresponding amount. The driving ratio is such that wheel 14 advances a tenth of a revolution for each cycle point of engagement and thus has ten rotative positions representative of the ten digits.

When wheel 14 stands at its rotative position 9, a carry lever 20 rocks to close 9's carry contacts 21 and, when the wheel passes from 9 to 0 position, 10's carry contacts 22 are closed and latched as shown. To effect a carry entry of one unit, lever 17 is rocked counterclockwise after the 0 point in the cycle, and one point later it is rocked back again to effect uncoupling. A pin

24 is timed to release the latched carry lever 20 after this carry period in the cycle.

A magnet 25 designated "Start," when energized, will rock lever 17 counterclockwise to start rotation of the accumulating wheel 14, and a second magnet 25 designated "Stop," when energized, will rock lever 17 in reverse direction to stop rotation of the wheel. This second magnet is employed for operations wherein the 9's complement of a digit is entered by initially energizing "Start" magnet 25 at the 9 point in the cycle and thereafter energizing "Stop" magnet 25 at the cycle point corresponding to the value of the digit whose 9's complement is to be entered.

As usual in this type of accumulator, each wheel 14 has connected thereto a so-called read-out brush 26 (shown diagrammatically in the circuit, Figs. 1c and 1e) which takes any of ten positions with relation to a series of contact segments 27 to effect an electrical connection between the segment and a common conductor 28. In the actual accumulator, the segments 27 and conductor 28 are circularly disposed as is well known but in the circuit they are illustrated in a linear manner for more convenient explanation and circuit tracing.

Figure 1A:
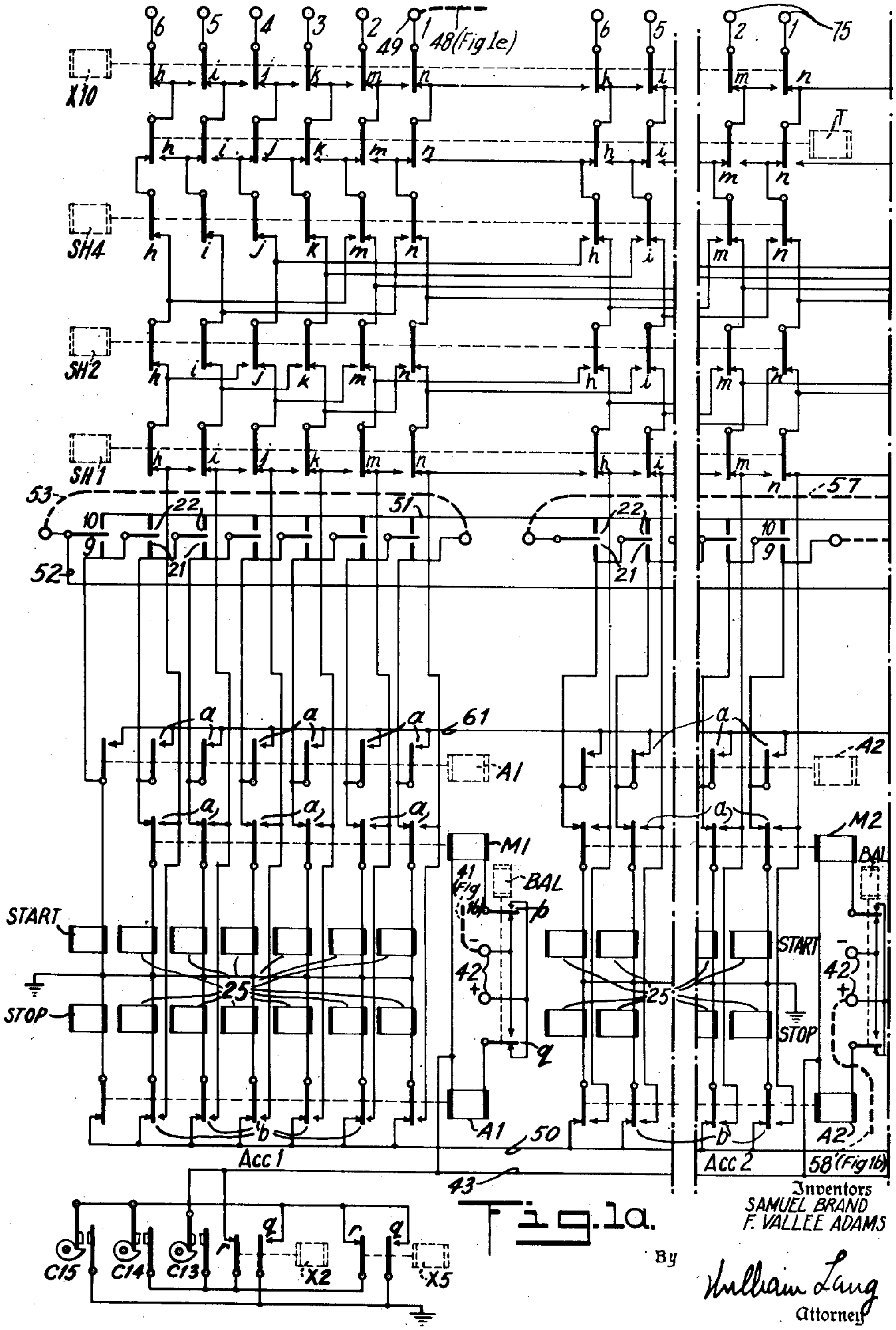
Figure 1B:
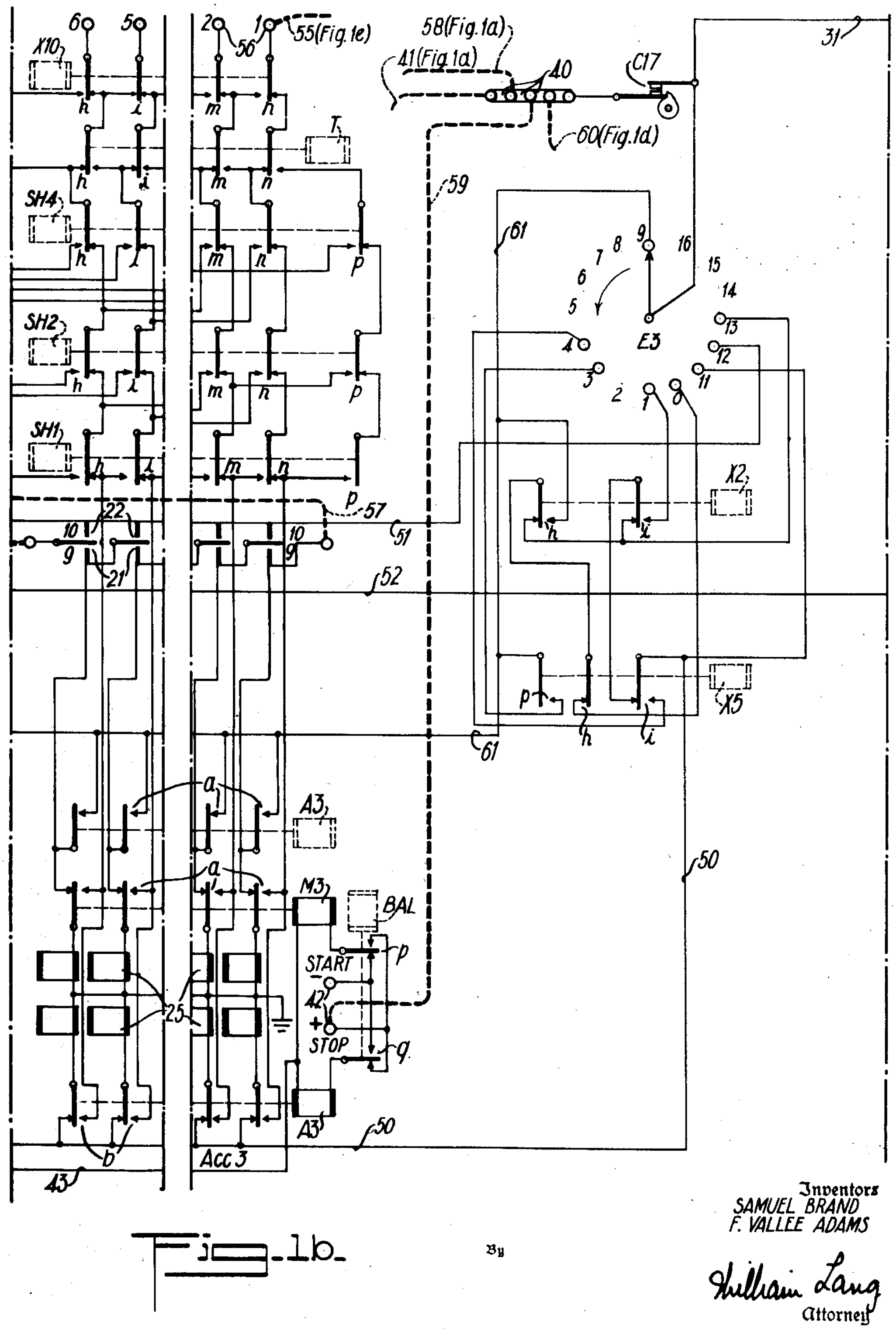
Figure 1C:
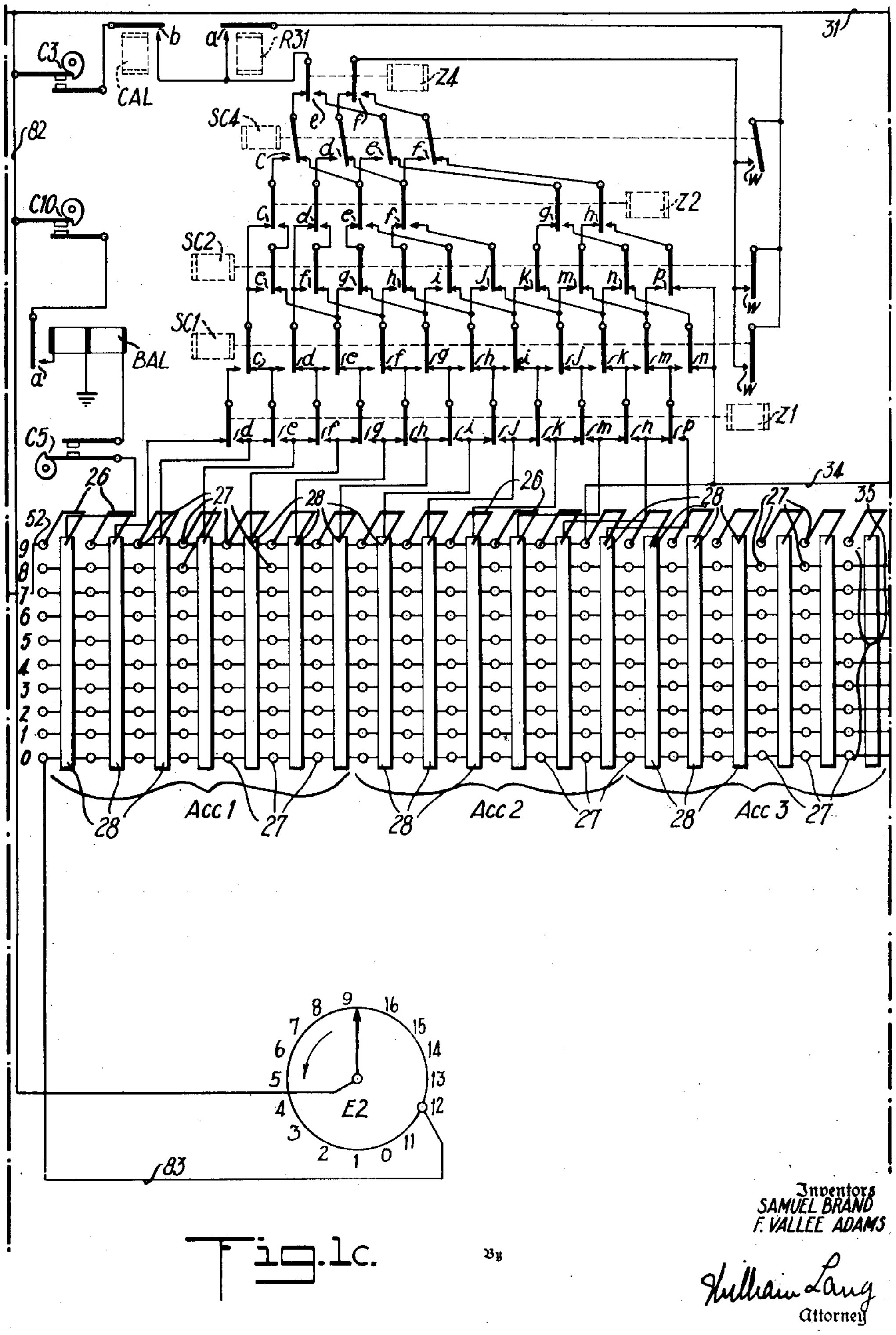
Figure 1D:
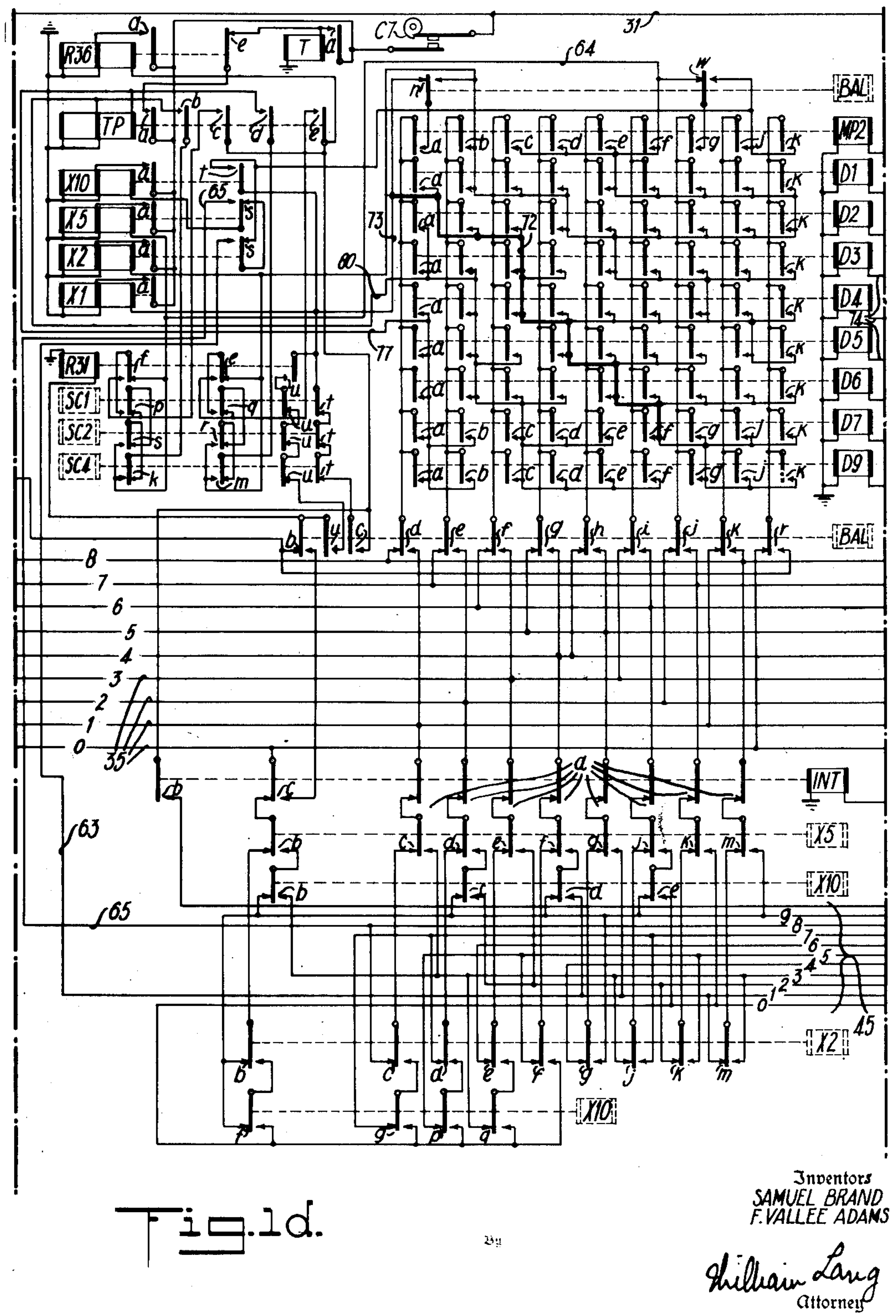
Figure 1E:
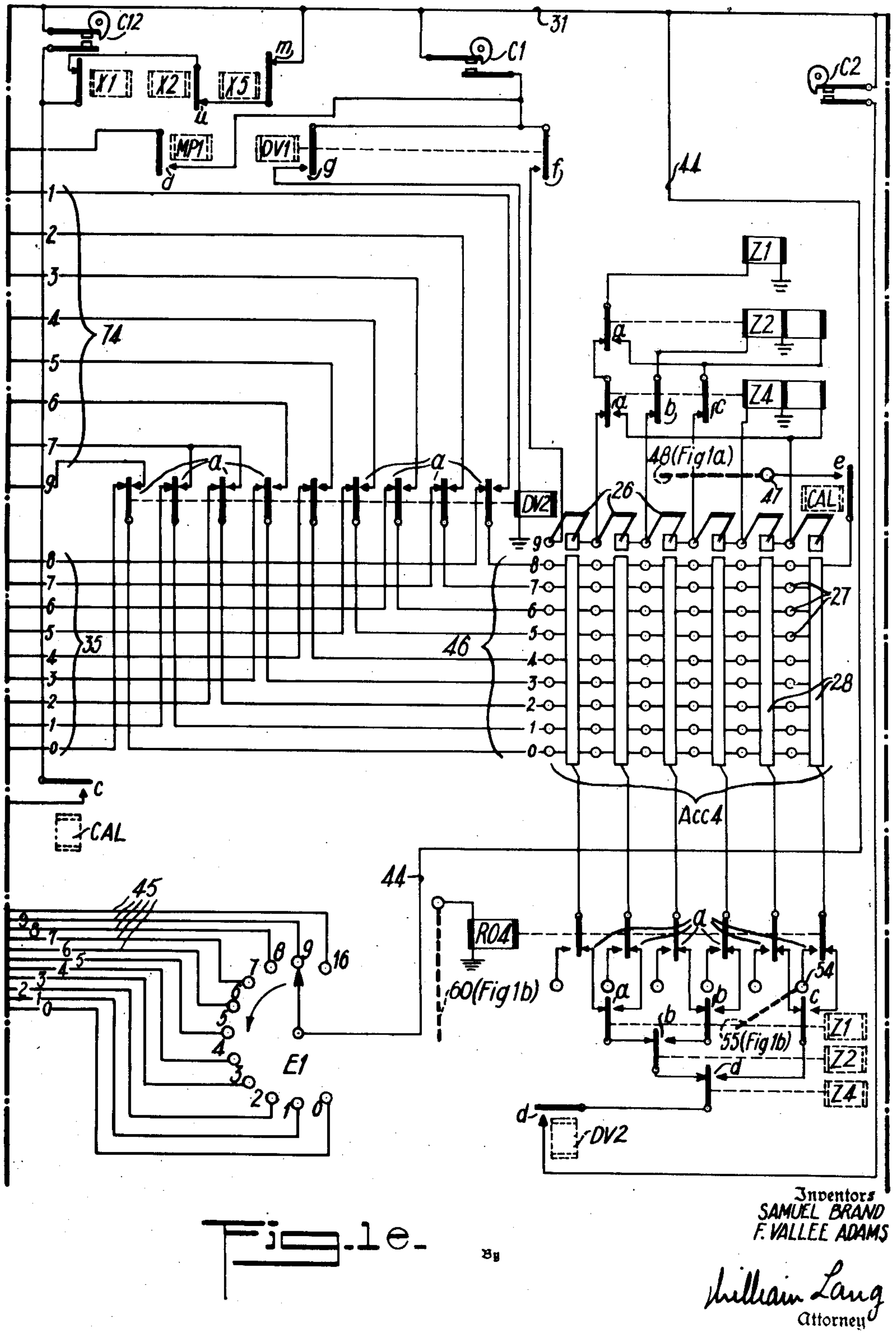

The separate units or orders are grouped to form several accumulators designated as ACC. 1, ACC. 2, ACC. 3 (Fig. 1c) and ACC. 4 (Fig. 1e).

A brief explanation will first be given of the mathematical steps involved in the solution of a problem in multiplication.

Figures 2, 3:
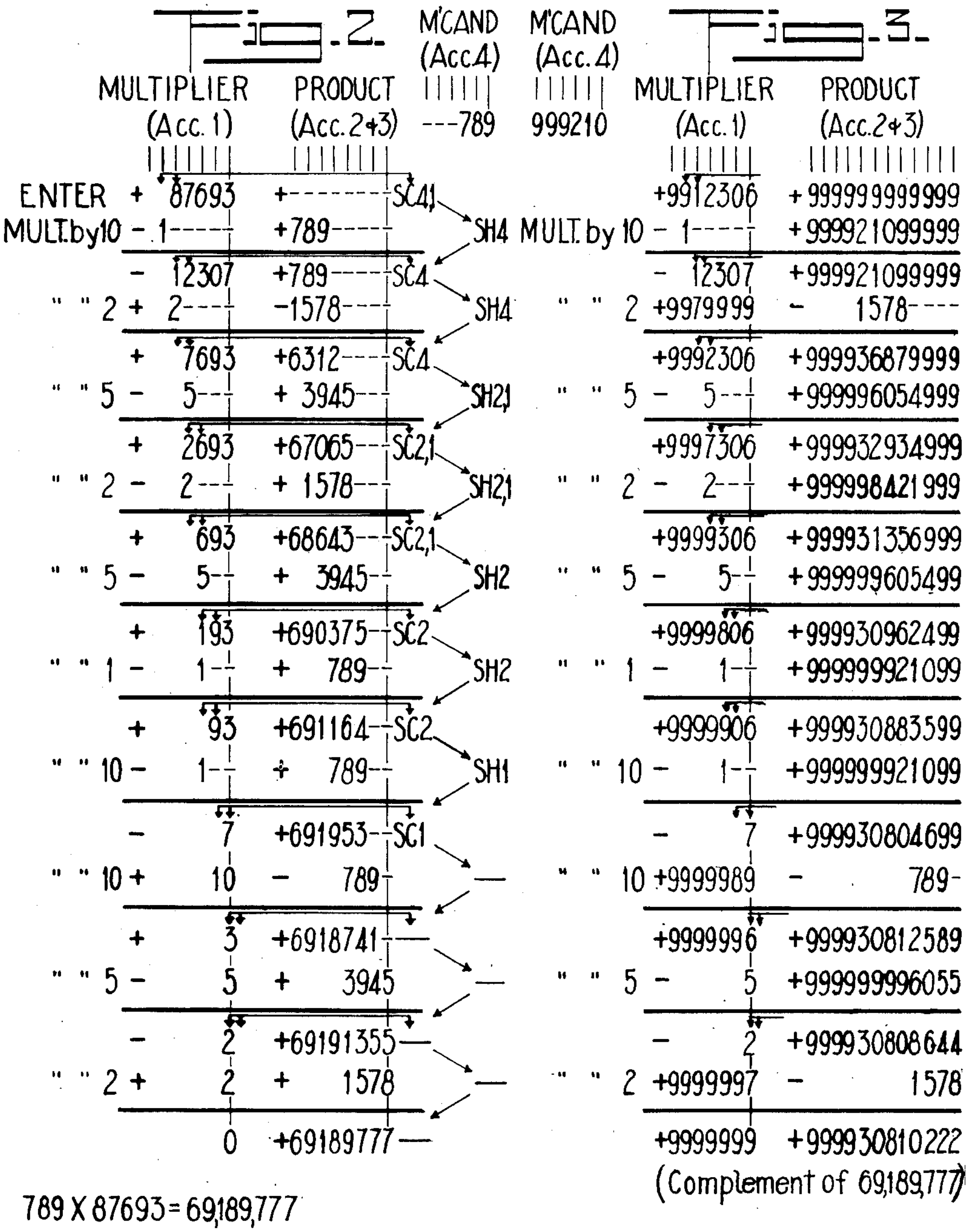

Referring to Fig. 2, the factors 789 and 87693 are to be multiplied. As a preliminary, the multiplier 87693 is entered into the multiplier accumulator in the orders indicated and the multiplicand is entered into its accumulator. An examination is made of the highest significant digit in the multiplier, and in accordance therewith the values 1, 2 or 5 are algebraically combined with the multiplier. The digit selection is in accordance with the following table which shows for each of the digits 1 to 9 the multiplier selected, with the plus digit values grouped in the upper part of the table and the minus digit values grouped in the lower part of the table.

MULTIPLIER SELECTION

| Sign | Digit Multiplier |
|---|---|
| + | 1 selects 1 |
| + | 2 selects 2 |
| + | 3 selects 5 |
| + | 4 selects 5 |
| + | 5 selects 5 |
| + | 6 selects 5 |
| + | 7 selects 5 |
| + | 8 selects 10 |
| + | 9 selects 10 |
| − | 1 selects 2 |
| − | 2 selects 2 |
| − | 3 selects 5 |
| − | 4 selects 5 |
| − | 5 selects 5 |
| − | 6 selects 5 |
| − | 7 selects 10 |
| − | 8 selects 10 |
| − | 9 selects 10 |

The selection of the value 10 represents selection of 1 accompanied by a column shift to the left.

Thus, for the problem chosen the multiplier digit is 8 and has a plus value. Accordingly, the value 1 is selected (see table above, where "+8 selects 10") and entered with a column shift one place to the left and entered subtractively with a resulting negative remainder of 12307. The change in sign signifies an overdraft which will result in the next entry being made additively.

Concurrently with this subtraction, 1 times the multiplicand 789 is entered into the product accumulator in appropriate denominational allocation so that, after the first step or cycle of operation, the multiplier accumulator contains the negative remainder and the product accumulator contains what is in effect 10 times the value of the multiplicand.

A further and subsequent inspection of the highest digit of the remainder shows it to be a negative 1 which from the table (−1 selects 2) calls for a multiplier of 2. Accordingly, the 2 is entered additively in the same order as the 1 of the multiplier and the algebraic summation results in the positive remainder 7693. Concurrently, 2 times the multiplicand is entered subtractively in the product accumulator with the positive result of 6312. At this point the product accumulator represents 10 times, minus 2 times, or 8 times the multiplicand.

The third selection in accordance with the plus digit value 7 calls for a multiplier of 5 (see table above where "+7 selects 5") which is entered negatively in the multiplier accumulator to obtain the positive remainder 2693 and the concurrent entry of 5 times the multiplicand advances the product accumulator to 67065.

From the foregoing, it is readily seen that the multiplying operation is essentially one in which the highest significant digit of the multiplier is inspected together with its sign and a selection of the values 1, 2 or 5 is made in accordance with the foregoing table. The selected digit is algebraically combined with the multiplier to reduce it in the highest order with special consideration for the plus 8 and 9 digits and the minus 7, 8 and 9 digits which call for selection of the value 1 with a column shift to the left.

Continuing, the repeated inspection of the successive remainders and entry of the 1, 2 and 5 multiples of the multiplicand, together with entry of the 1, 2 and 5 digits, will cause the multiplier to ultimately reduce to 0, and for the example chosen the product accumulator will stand at 69,189,777 at such time to represent the final product.

In Fig. 3 the steps of Fig. 2 are repeated to show the settings of the accumulator elements in the machine. The accumulators employed are normally reset to 9's in all orders and the factors are initially represented as indicated by their 9's complement. Thus, the multiplier accumulator is set to represent 9,912,306. The plus sign to the left thereof indicates that the true value of the entry is positive.

The initial inspection will select the digit 1 and the algebraic summation will result in the value 12,307 of negative sign. The successive steps involved can be readily followed by keeping in mind that, when an amount is entered additively, it takes the form of the 9's complement and, if entered negatively or subtractively, it appears as a true number so that, with the steps carried out in correspondence with Fig. 2, the multiplier will be reduced to a condition where 9's are present in all orders and the product accumulator contains the 9's complement of the product 69,189,777.

*Circuit diagram*

The circuits involved in carrying out the multiplying problem of Fig. 2 will now be explained in connection with the diagram of Figs. 1*a* to 1*f*. For the purposes of simplicity of explanation, it will be assumed that the multiplier and multiplicand values are set up in their respective accumulators by direct positioning of brushes 26.

Figure 8:
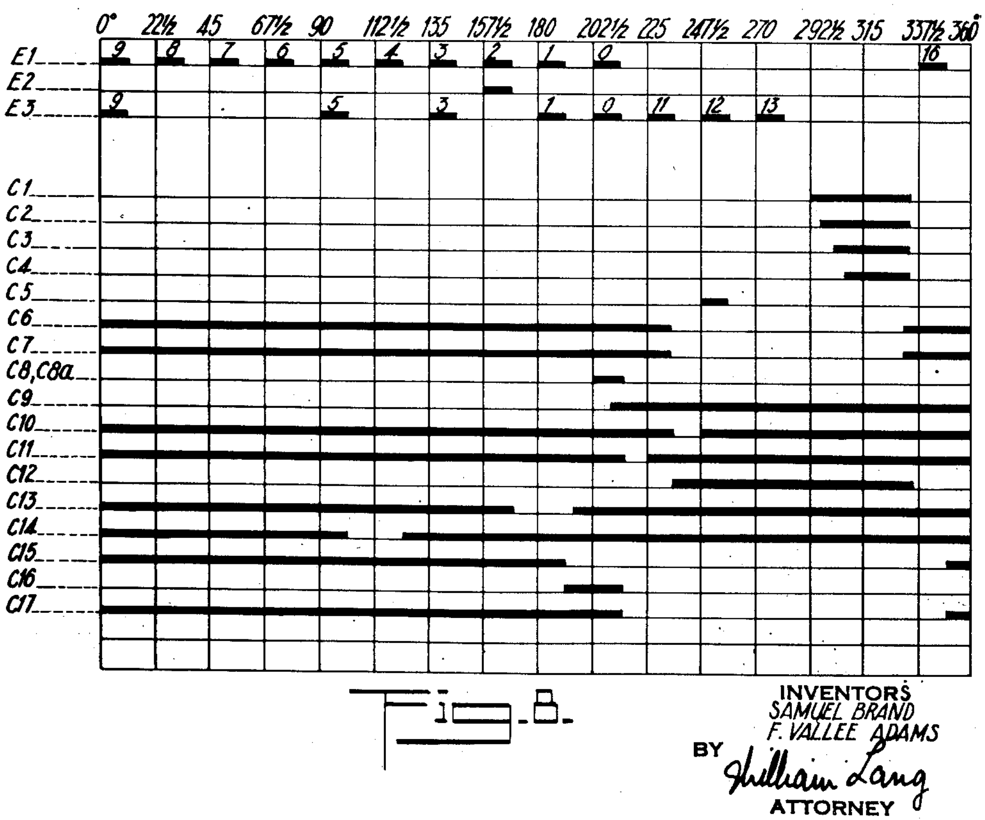
Fig. 8 is a time chart of the cam controlled contacts of the machine.

In the diagram are represented a number of cam controlled contacts prefixed with the letter C. Their controlling cams are driven by the contantly running cyclic shaft 10 (Fig. 7) and the timing of the contacts is as shown in the diagram (Fig. 8).

For purposes of simplicity in the disclosure, accumulator 4 is represented solely by its readout device 26, 27, 28 (Fig. 1*e*), inasmuch as for a multiplying operation it is set up to represent the multiplicand and such setting is not changed throughout the operation.

Referring to Fig. 1*c*, the multiplier is set up in accumulator 1 and brushes 26 of this accumulator will be set to represent the 9's complement 9,912,306 according to Fig. 3. The multiplicand is set up on accumulator 4 (Fig. 1*e*) by having the related brushes 26 positioned to represent the complement 999,210. As a further preliminary, several plug connections to the accumulators are made and these will be pointed out at the time that their effectiveness is explained.

*First cycle*

Figure 1F:
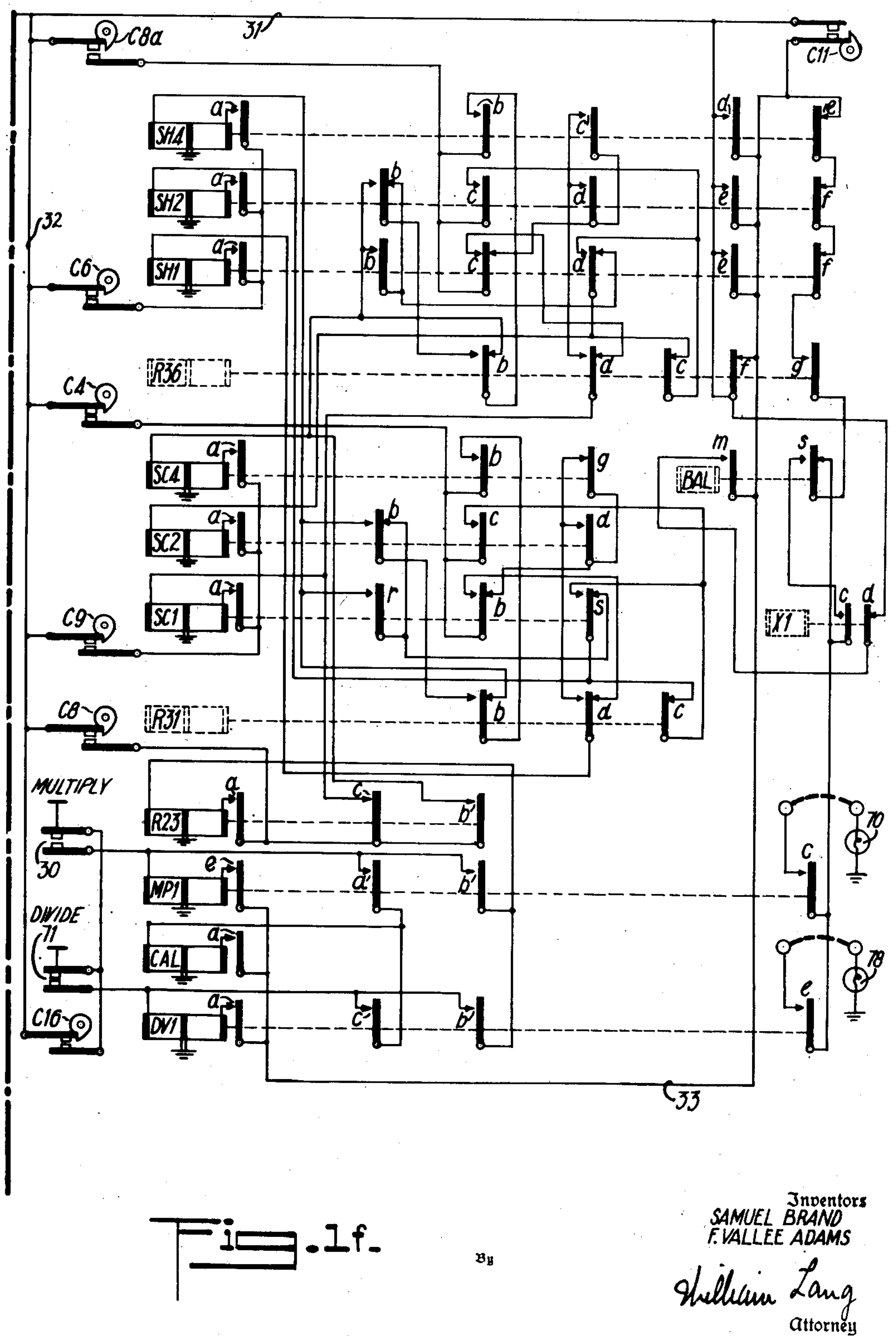

Referring to Fig. 1*f*, the multiply key is depressed to close contacts 30 which will complete a circuit from main line 31, wire 32, contacts C16, contacts 30, pickup winding of relay MP1 to ground. The relay will close its *e* contacts to provide a holding circuit through wire 33 and *f* contacts of relay R36 to line 31. A parallel holding circuit also extends from wire 33, through cam contacts C11, so that relay MP1 will now remain energized until relay R36 is energized and contacts C11 open. The sequence of operations is set forth in Figs. 12*a* and 12*b* which may be followed in conjunction with the circuit diagram. Relay MP1 closes its *a* contacts and completes a circuit from line 31, wire 32, contacts C16, 30, *a* contacts of relay MP1, pickup winding of calculate relay CAL to ground. This relay closes its *a* contacts to provide a holding circuit therefor which parallels the holding circuits of relay MP1. A further circuit extends from contacts 30, through the *b* contacts of relay MP1 to relay R23, and this relay closes its *a* contacts to provide a holding circuit through contacts C8.

During the period that contacts C8 are closed, a circuit is traceable from line 31, wire 32, contacts C8, *c* contacts of relay R23, shift control relay SC1 to ground. A parallel circuit extends through the *b* contacts of relay R23 and to relay SC4. Thus, as a result of the energization of relay R23, the shift control relays SC1 and SC4 are energized, and these will close their *a* contacts to hold through contacts C9 to the end of the first cycle as indicated in Fig. 12*a*. Briefly, at the beginning of operations, relay R23 by controlling energization of relays SC1 and SC4 effects the maximum column shift condition for testing the highest orders of the multiplier accumulator, as will be explained presently. As indicated in Fig. 12*a*, interlock relay INT is energized during the first cycle, through a circuit traceable from line 31 (Fig. 1*e*), *m* contacts of relay X5, *u* contacts of relay X2, *s* contacts of relay X1, and *c* contacts of relay CAL to relay INT (Fig. 1*d*). Relay INT opens back circuit preventing contacts generally designated *a* (Fig. 1*d*) and also shifts contacts designated *b* and *c*.

Referring to Fig. 1*c*, a circuit is now traceable from line 31, contacts C3, *b* contacts of relay CAL (now closed), *e* contacts of relay Z4, *c* contacts of relay SC4 (shifted), *c* contacts of relay Z2, *c* contacts of relay SC1 (shifted), *d* contacts of relay Z1 to the common conducting strip 28 of the next to the highest order of accumulator 1. In this order, brush 26 is set at 9 (see Fig. 3), so that the circuit will continue through the related brush to the 9 segment 27, thence through wire 34 (Fig. 1*d*), *b* contacts of balance relay BAL and relay R31 to ground. The energization of relay R31 indicates that in the order tested there is no significant true digit, and it will immediately recondition the circuits to make a test of the next lower order during the period that the contacts C3 are closed, that is, within the same cycle.

With the *a* contacts of relay R31 now closed (top of Fig. 1*c*) the parallel testing circuit extends from line 31, contacts C3, *b* contacts of relay CAL, *a* contacts of R31, *w* contacts of SC4 (shifted), *f* contacts of Z4, *d* contacts of Z2, *d* contacts of SC1 (shifted), *e* contacts of Z1 to the next conducting strip 28. In this order, the brush 26 is set at 1 so that the circuit continues to the 1 segment and thence through the 1 wire of the group designated 35 (Fig. 1*d*), *k* contacts of relay BAL, *j* contacts of relay MP2 (now shifted as will presently be explained), *s* contacts of relay X2, *s* contacts of relay X5, and a winding of relay X10 to ground. Relay X10 closes its contacts designated *t* to complete a parallel circuit from the *j* contacts of relay MP2 through the *t* contacts of X10 and the pickup winding of relay X1 to ground. Relays X1 and X10 close their *a* contacts to provide holding circuits through contacts C7.

Relay MP2 was previously energized through a circuit from line 31, contacts C1 (Fig. 1*e*), *d* contacts of relay MP1 (closed), relay MP2 (Fig. 1*d*) to ground. The period of energization of relay MP2 is slightly longer than the period during which the testing contacts C3 are closed.

Upon closure of contacts C4 in the first cycle, a circuit is traceable from line 31, contacts C4 (Fig. 1*f*), *b* contacts of relay SC4 (closed), *b* contacts of relay R31 (shifted), *b* contacts of SC2, *r* contacts of relay SC1, pickup winding of shift relay SH4 to ground. Relay SH4 will close its *a* contacts to provide a holding circuit through contacts C6. The relay SH4 controls the column shift circuits through which multiples of the multipler are entered into the product accumulator and also controls the entry into the multiplier accumulator.

Briefly recapitulating the operations during the first cycle, the shift control relays SC4 and SC1 are first energized to direct the first test impulse from contacts C3 (Fig. 1*c*), through the position five steps to the left of the units order of the multiplier, which is the second highest order. It may be pointed out at this time that there are three such relays designated SC4, SC2 and SC1 (Fig. 1*f*) which singly effect shifts of 4, 2 and 1 steps respectively. Thus, with SC4 and SC1 energized, there is a 5 step shift; SC4 alone gives a 4 step shift; SC2 and SC1 together give a 3 step shift; CS2 alone gives a 2 step shift; SC1 alone gives a 1 step shift; and if none are energized the initial test circuit goes through the lowest or units order.

If the order (second highest) so tested contains a 9 (true 0), the relay R31 is energized to effect an immediate shift of the test circuit path to test the next lower order, so that no extra time is required beyond the period of closure of contacts C3 for testing two successive orders of the multiplier. Since the initial 5 step shift is found to be too great, circuits are set up to obtain the following entries with only a 4 step shift by causing energization of the shift relay SH4. The mathematical condition (an 8 in the highest significant order, Fig. 2) however calls for a column shift by energizing relay X10 to in effect change the shift condition back to a 5 step shift for purposes of allocating the 1 entry in the multiplier accumulator and the 789 entry in the product accumulator.

The SC (shift control) relays select the orders to be tested and control the SH (shift) relays which select the orders to receive the 1, 2 or 5 value and the multiplicand multiple, these conditions being modified if an additional shift is called for.

Inspection of the circuit network of Fig. 1*f* will show that, if relay R31 is not in energized condition when contacts C4 close, circuits will be completed through the contacts of the SC relays to energize the corresponding SH relays; that is, if SC4 is energized, it will cause energization of SH4; if SC2 is energized, it will cause energization of SH2; if SC1 is energized, it will cause energization of SH1 and combinations thereof. If, however, relay R31 has been energized, the SH relays energized will represent one unit less than the energized SC relays. Thus, SC4, SC1 will energize SH4; SC4 will energize SH2 and SH1; SC2, SC1 will energize SH2; SC2 will energize SH1; and SC1 will energize none.

In Fig. 2 the SC and SH relays that the energized throughout the successive steps in the example are designated. Thus, initially SC4 and SC1 are energized to control testing in the two positions indicated and will cause energization of SH4 during entry of 1 and 789 for four place shift, which is increased one step because relay X10 has been energized.

*Second cycle*

*Entering multiplier 1.*—During the second cycle the digit 1 is to be subtractively entered in the multiplier accumulator as indicated in Fig. 3. As a preliminary, the accumulator entering circuits are first conditioned to receive the amount as a true entry, that is, in an additive manner by rotating the appropriate adding wheels in accordance with the value of the digit.

Contacts C17 (Fig. 1*b*) close to prepare the accumulators to receive the entries, for example, accumulator 1 is to be conditioned to subtract a 1. In order to do this, it is necessary to energize the minus relay M1 (Fig. 1*a*) and shift its related contacts. In Fig. 1*b* a circuit extends from line 31, through contacts C17 to a series of sockets 40 and thence through a plug connection 41 (Fig. 1*a*) to a socket 42 designated by a minus sign, *p* contacts of relay BAL, relay M1, wire 43, *r* contacts of relay X2, *r* contacts of relay X5, contacts C15 to ground. Relay M1 shifts its *a* contacts whose common contacts are wired to the "Start" magnets 25 of accumulator 1. For purposes of simplification, only four orders are illustrated for the accumulators 2 and 3 as all are alike, and these are indicated (top of Figs. 1*a* and 1*b*) as 6, 5, 2 and 1. For accumulator 1, all seven orders are shown.

The entering circuit for the digit 1 is now traceable as follows: from line 31 (Fig. 1*e*), wire 44, to the brush of emitter E1 (driven from shaft 10) at the 1 time in the cycle, when the rotating contact brush engages the 1 segment, thence through the 1 wire of the group designated 45 (Fig. 1*d*), m contacts of relay X2, *m* contacts of X5, *a* contacts of INT (now closed) to the 8 wire of the group designated 35 (Fig. 1*e*), right hand *a* contacts of relay DV2, the 8 wire of the group designated 46, which continues through *e* contacts of relay CAL to a plug socket 47 from which a connection 48 is made to socket 49 (Fig. 1*a*) related to the units order of accumulator 1. From here the circuit extends through the *n* contacts of X10 (shifted), *m* contacts of a relay T, *m* contacts of relay SH4 (which is now energized), and thence down through the *h* contacts of SH2, *h* contacts of SH1, left hand *a* contacts of M1 (shifted) to the start magnet 25 in the hundreds of thousands order (second highest) of accumulator 1. It is thus seen that SH4 causes a four place shift and X10 causes an additional step to effect a total shift of five places to the left of the units order.

Figure 9:
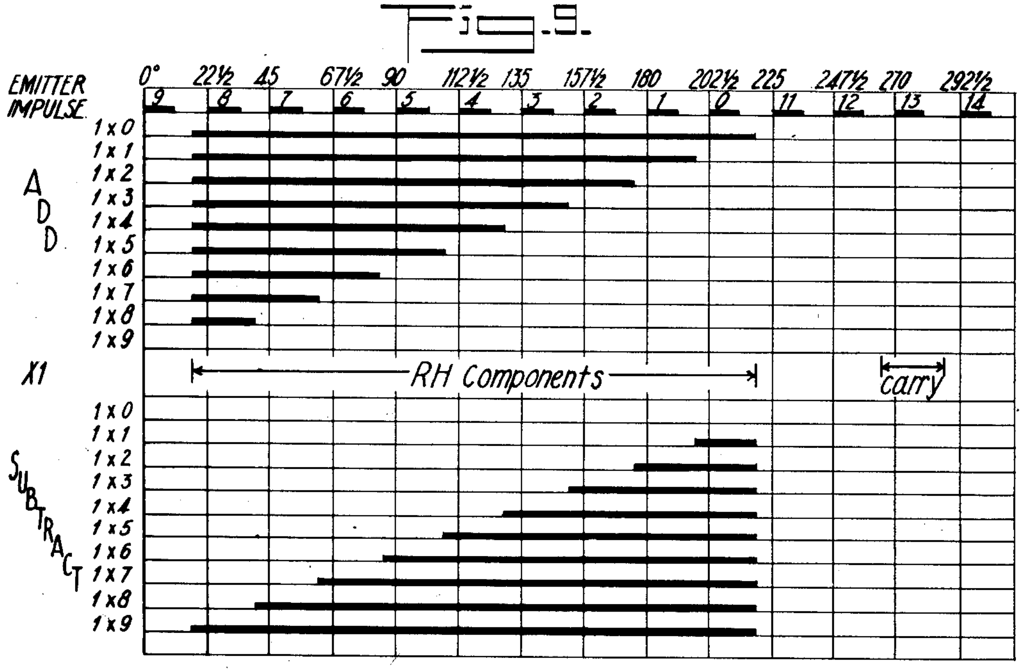
Fig. 9 is a chart showing the period of rotation of the adding wheels when multiplying by 1.

Energization of start magnet 25 at this 1 time will engage the related adding wheel and it will advance one step, after which the corresponding stop magnet will be energized through a circuit traceable from line 31 (Fig. 1*b*), 0 spot of emitter E3, *h* contacts of the X5 relay, *h* and *i* contacts of the X2 relay, *i* contacts of X5 to common wire 50 (Fig. 1*a*) extending over and through all the *b* contacts of the plus relay A1 to the stop magnets 25 and ground. In this manner the wheel in the hundreds of thousands order of accumulator 1 is advanced one step. In the other orders, the stop magnet energization is, of course, an idle operation, since no preceding start operation was initiated in these orders. In Fig. 9 is shown the extent of rotation of the adding wheel for each digit entry during adding and subtracting operations.

At the carry time in the circuit, which is initiated at the 12 index point position, the emitter E3 will complete a circuit from line 31 (Fig. 1*b*), through the 12 segment of the emitter to wire 51, over to the tens carry contacts 22 in the hundreds of thousands order of accumulator 1, wherein the tens contacts 22 are now closed, thence to the highest order position in which the 9 contacts 21 are closed, thence through wire 52 (Figs. 1*b* and 1*c*) to the 9 segment 27 in the highest order brush 26 (set at 9), the common strip 28, contacts C5 to balance relay BAL and ground which will hold through contacts C10.

With this arrangement there is a balance test concurrent with the tens carry circuit completion which in effect anticipates that, when the carry is completed, the accumulator will have changed from a 9 setting to a 0 setting, thus indicating that the true value of the number in the accumulator has changed from a positive to a negative value.

The carry circuit also branches from the highest order of the accumulator (Fig. 1*a*) through the plug connection 53, the 9's contact 21 in the lowest order to enter the usual fugitive 1 in the units order by completing circuits to the start magnet thereof at the 12 time in the cycle, through the *a* contacts of relay M1 (now deenergized). Then at the 13 time the emitter E3 (Fig. 1*b*) sends another stop impulse to the wire 50, through *h* contacts of X2 and X5 to the stop magnets, and through *a* contacts of relay A1. Also, at the carry time the usual carry impulse will be directed to the highest order start magnet for the example under consideration.

*Entering 1×789.*—As the emitter E1 (Fig. 1*e*) rotates in the second cycle, it completes a circuit at the 9 time through the 9 wire of the group 45 (Fig. 1*d*), through *b* contacts of X2, *b* contacts of X5, *c* contacts of INT, to the 0 wire 35 (Fig. 1*e*), left hand contacts of DV2, the 0 segment 27 in the units order of the multiplicand accumulator, brush 26 and conductor 28, *a* contacts of relay RO4 (now energized as will be explained), units socket 54 and plug connection 55 (Fig. 1*b*) to units socket 56 of the product accumulator (ACC. 3), thence through *n* contacts of X10 (shifted), *m* contacts of T, *m* contacts of SH4 (shifted), *h* contacts of SH2, *h* contacts of SH1, *b* contacts of A3 (shifted) and stop magnet 25 in column 6 position of accumulator 3. This impulse occurs at the 9 time and is concurrent with the start impulse sent at the same time to all of the start magnets in the product accumulators 2 and 3. This start impulse is traceable in Fig. 1*b* from line 31, 9 segment of emitter E3, wire 61 and thence through all the *a* contacts (shifted) of relays A2 and A3, all the *a* contacts of relays M2 and M3 to all the start magnets 25 of accumulators 2 and 3.

It may be mentioned at this point that accumulators 2 and 3 are tied together electrically to constitute a single accumulator of 12 column capacity by a plug connection 57 (Figs. 1*a* and 1*b*) between carry contact sockets as shown. The control for the initial energization of relays A2 and A3 is brought about as follows. The impulse from contacts C17 (Fig. 1*b*) is plugged from sockets 40, through connections 58 and 59 to the sockets 42 designated with a plus sign and related to accumulators 2 and 3, respectively, to energize the A2 and A3 relays through the *q* contacts to the balance relay BAL. A further parallel circuit also extends through connection 60 to the socket leading to the readout magnet RO4 (Fig. 1*e*) of accumulator 4. The circuit through the magnets A2 and A3 extends through wire 43 (Figs. 1*b* and 1*a*) to *r* contacts of X2 and X5, contacts C15 to ground (see Fig. 12*a*).

It will be particularly noted in Fig. 1*a* that, when neither the X2 nor X5 relays are energized, the circuit from wire 43 (and the A and M relays) extends through contacts C15, and the duration of energization is determined by the timing of these contacts. If relay X2 were in energized condition, the circuit would extend through and be controlled by contacts C13 so that, as shown for the third cycle (Fig. 12*a*) the A and M relays would be deenergized for a short period from 169° to 195°. If relay X5 were in energized condition, the circuit would extend through and be controlled by contacts C14 so that, as shown for the fourth cycle (Fig. 12*b*) the A and M relays would be deenergized for a short period from 101° to 125°.

In the column 6 position of accumulator 3, therefore, the start and stop impulses are concurrent and, since in this type of accumulator concurrent impulses to the start and stop magnets 25 will not change the condition thereof, that is, if the accumulator wheel is at rest, it will remain at rest.

Figure 10:
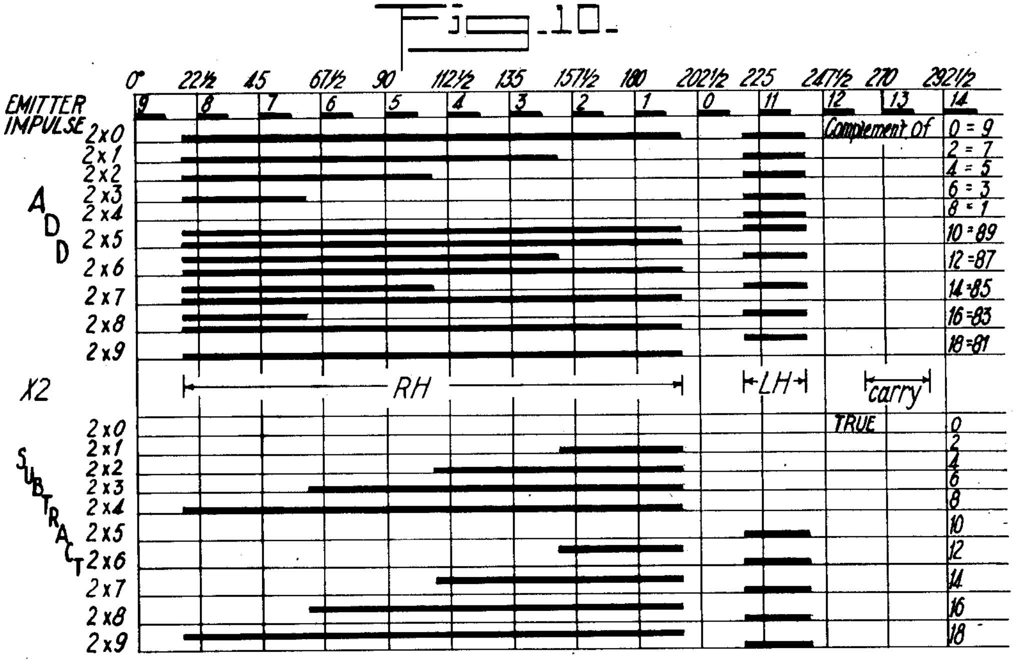
Fig. 10 is a chart showing the period of rotation of the adding wheels when multiplying by 2.

In the tens order of the multiplicand accumulator, which is set at the complement 1, a similar circuit will be traceable at the 8 time in the cycle to energize the stop magnet 25 in the position 1 of accumulator 2. This will occur one point after the start impulse so that this order will be advanced one step (see Fig. 10). In like manner and through similar circuits the 2 position of accumulator 2 will be advanced two steps. In all other positions, the wheel will advance as a result of the initial start impulse until at the 0 time in the cycle a stop impulse is transmitted from emitter E3 through the wire 50 as already traced to energize all the stop magnets.

It will be noted that as a result of this entry tens carry will take place in appropriate positions and that there will be a tens carry from the highest order through the plug connection 57 to the lowest order to enter the fugitive 1 therein, and at the end of the cycle the product accumulator will represent the complement of 789 followed by 00000.

The denominational location of the entries into the product and multiplier accumulators is dependent upon which of the shift relays SH1, SH2 or SH4 is energized. If the SH4 relay is energized as for the instant example, there is an accumulator entry shift of four places to the left. If in addition thereto the X10 relay is energized, there is an additional shift of one column.

It may be pointed out at this time that, if the SH2 relay is energized, there would be a column shift of two places. If the SH1 relay is energized, there will be a column shift of one place. The SH2 and SH1 together will cause a column shift of three places, SH4 and SH1 bring about a column shift of five places, etc., with any of these column shifts being increased by 1 if there is an accompanying energization of the X10 relay. As indicated in the timing diagram (Fig. 12*a*), the shift control relays SC1 and SC4 drop out at the end of the first cycle upon opening of contacts C9 (Fig. 1*f*) after having controlled the energization of the shift relay SH4.

Later in the second cycle, when the contacts C8*a* (Fig. 1*f*) close, a circuit is completed through *b* contacts of SH4 (now closed), *b* contacts of R36 to energize relay SC4 again. Thereafter, contacts C6 open to deenergize SH4. At the testing time when the contacts C3 (Fig. 1*c*) now close, relays CAL and SC4 are in energized condition, so that the circuit is traceable to the common conductor 28 in the third highest position wherein the brush 26 is now set at the 1 segment (see Fig. 3) so that the circuit continues through the 1 wire 35 (Fig. 1*d*), thence through *d* contacts of BAL (now shifted), *a* contacts of MP2 (closed), *n* contacts of BAL (shifted) and the X2 relay to ground, which relay will now hold through contacts C7 into the next cycle.

With relay SC4 energized, when contacts C4 (Fig. 1*f*) close, relay SH4 will be energized through the circuit from line 31, wire 32, *b* contacts of SC4 (closed), *b* contacts of R31 and relay SH4 to ground. This relay will hold through contacts C6 as before and at the end of the cycle, when contacts C9 open, relay SC4 will become deenergized leaving the setting transferred to the shift relay.

Near the end of the second cycle with relay BAL energized, the accumulator conditioning circuits from contacts C17 (Fig. 1*b*) will extend to the sockets 42 as before, but for accumulator 1 (Fig. 1*a*) the circuit will extend through shifted *q* contacts of relay BAL to energize relay A1 instead of M1. For accumulators 2 and 3, the circuits will extend through shifted *p* contacts of BAL to energize the relays M2 and M3 instead of A2 and A3. Since relay X2 is now in energized condition, the relays A1, M2 and M3 will be energized for two distinct periods as shown in Fig. 12*a* and under control of contacts C13 as explained hereinabove. Briefly, when contacts C17 close, the energizing circuit extends from wire 43 (Fig. 1*a*), through contacts C13, *r* contacts of X5 and *q* contacts of X2 (shifted) to ground. This circuit is broken upon opening of contacts C13 and remains open for a short period until reclosure of contacts C13, after which it is held until contacts C17 open.

*Third cycle*

*Entering multiplier 2.*—In this cycle 9,979,999 is to be entered in ACC. 1 and 1578 is to be entered in ACC. 2, 3. At the 9 time an impulse from emitter E3 (Fig. 1*b*) extends from line 31, 9 segment of emitter E3, wire 61 (Fig. 1*a*), through all the *a* contacts of relay A1 (now closed), all the *a* contacts of relay M1 to all the start magnets 25 of ACC. 1 so that in all orders the wheels commence to rotate (see Fig. 10).

In the third highest order, a stop circuit is traceable (Fig. 1*e*) from line 31, wire 44 to the 3 segment of emitter E1 to the 3 wire 45 (Fig. 1*d*), *m* contacts of relay X2 (shifted), *m* contacts of relay X5, *a* contacts of INT to the 8 wire 35, *a* contacts of DV2, 8 wire 46, *e* contacts of CAL, to the plug socket 47 connected through connection 48 (Fig. 1*a*) to the units socket 49 of accumulator 1, thence down through the *n* contacts of X10, *n* contacts of T, *n* contacts of SH4 (shifted), *i* contacts of SH2, *i* contacts of SH1, *b* contacts of A1 (shifted) to the stop magnet 25 in the third highest order. The timing is such that the wheel will be stopped after six steps of advance, i. e., it starts at the 9 time and stops at 3. In all the other orders the wheels will be stopped after eight steps of advance through the circuit from the emitter E3 (Fig. 1*b*) to the 1 segment, *i* contacts of relay X2 (shifted), *i* contacts of relay X5, wire 50 (Fig. 1*a*), *b* contacts of relay A1 (now back in normal position), to the stop magnets 25. The manner in which the *b* contacts of relay A1 are restored to normal prior to the completion of the stop circuit is as follows: the circuit to the A1 relay, as explained, extends through contacts C13 (Fig. 1*a*) which, as noted, open just before the 1 time in the cycle, so that the A1 relay becomes deenergized at this time and the stop impulse may then extend through its contacts to stop the advance of the accumulator.

Just before the 0 time, the reclosure of contacts C13 will reenergize the A1 relay which will be held from wire 43, through contacts C13, *r* contacts of X5, *q* contacts of X2 (shifted) to ground (it being recalled that contacts C15 open just before 0). This circuit breaks when contacts C17 (Fig. 1*b*) open. At the 0 time in the cycle, emitter E3 sends an impulse through its 0 segment, *h* contacts of relay X5, *h* contacts of relay X2 (energized), wire 61 (Fig. 1*a*), the now closed *a* contacts of the A1 relay to energize all the start magnets 25 in accumulator 1.

After one additional step of movement, the emitter E3 will send a circuit through the 11 segment, wire 50, *b* contacts of relay A1 which are now back in normal position to the stop magnets 25. The deenergization of the A1 relay results from the opening of contacts C17 just before the 11 point in the cycle.

Following this, at the carry time the impulse to the 12 segment of emitter E3 will transmit the usual carry start impulse to wire 51 and the following impulse at the 13 time will extend to the stop impulse wire 50, through *h* contacts of X2 (which are now in normal position). The controlling magnet X2 was deenergized upon opening of contacts C7 at the time indicated in the diagram (Fig. 12*a*). At the end of this cycle, therefore, the multiplier accumulator is set to represent the complement 9,992,306.

*Entering* 2×789.—In the product accumulator two times the multiplicand is entered by rotating the wheels in accordance with the true value of the multiple 1578. The multiple is obtained by deriving the left and right hand components of the partial products of 2 times the multiplicand. The arrangement is such that both components may be entered during a single cycle. This multiplication may be represented as follows:

| | |
|---|---|
| Multiplicand | 789 |
| Multiplier | 2 |
| L. H. component | 111 |
| R. H. component | 468 |
| Product | 1578 |

Inspection will show that with 2 as a multiplier the digits of the L. H. component will never be greater than 1 and the digits of the R. H. component will be either 2, 4, 6 or 8. Accordingly, the sum of any pair of left and right hand components in any order will never exceed 9, and there will never be a tens carry involved in their summation. The manner in which the two components are entered in one cycle will be made clear as the explanation progresses.

Considering the entry of the digit 8, which is the most right hand component, the circuits involved are as follows: the emitter E1 (Fig. 1*e*) will send an impulse through the 9 segment and the 9 wire 45, *f* contacts of relay X10, *b* contacts of relay X2 (shifted), *b* contacts of X5, *c* contacts of INT, 0 wire 35 (Fig. 1*e*), *a* contacts of DV2, 0 wire 46, 0 segment 27 in the units order of accumulator 4, brush 26, conductor 28, *a* contacts of relay RO4 (shifted), socket 54, connection 55 (Fig. 1*b*), socket 56, thence through the *n* contacts of X10, *n* contacts of T, *n* contacts of SH4 (shifted), *i* contacts of SH2, *i* contacts of SH1, *a* contacts of relay M3 in column 5 and thence through the start magnet 25 to ground. At the 1 time, emitter E3 (Fig. 1*b*) will transmit an impulse through the *i* contacts of X2 (shifted) and the *i* contacts of X5, to wire 50 as before, to stop rotation of the wheel (see Fig. 10).

In the next higher order the left hand component 1 and the right hand component 6 are to be entered during the single cycle, and this is effected as follows: through its 7 segment, emitter E1 (Fig. 1*e*) transmits an impulse to the 7 wire 45 (Fig. 1*d*), *g* contacts of X10, *c* contacts of X2 (shifted), *c* contacts of X5, *a* contacts of INT to the 1 wire 35 (Fig. 1*e*), *a* contacts of DV2, 1 wire 46, 1 segment 27 in the tens order of accumulator 4, brush 26 (set at 1), conductor 28, *a* contacts of RO4 (shifted) to the tens socket 54, connection to tens socket 56 (numbered 2, Fig. 1*b*), through *a* contacts of M3 (shifted) to the start magnet 25 in column 6. The stop impulse will be directed to the corresponding stop magnet 25 at the 1 time concurrently with the stop impulse as traced for the lower order. Accordingly, at the 1 time the wheel in column 6 will have advanced 6 steps.

At the 1 time, the emitter E1 (Fig. 1*e*) transmits an impulse through its 1 segment to the 1 wire 45 (Fig. 1*d*), then up through a wire 63, through *s* contacts of X2 (shifted) and *s* contacts of X5 to energize the X10 relay which will hold through its *a* contacts and C7. The purpose of this relay is to readjust the column shift circuit connections so that the left hand partial product related to the units order can now be selected for controlling operations.

At the next following point an impulse through the 0 segment will extend from emitter E1 to the 0 wire 45 (Fig. 1*d*), *f* contacts of X10 (now shifted), *b* contacts of X2 (shifted), *b* contacts of X5 and *c* contacts of INT to the 0 wire 35 (Fig. 1*e*), *a* contacts of DV2, wire 46, 0 segment in the units order, units socket 54, connection 55 (Fig. 1*b*), socket 56 (No. 1), *n* contacts of X10 (now shifted) and thence down to start magnet 25 in column 6. At the next cycle point 11, emitter E3 will transmit the stop impulse to wire 50 to interrupt rotation after one step of movement. In this manner the right hand component 6 and the left hand component 1 in the tens order of the product 2 times 789 are entered during the single cycle.

In the hundreds order of ACC. 4 similar circuits from emitter E1 will transmit an impulse through it 5 segment, energizing the next higher start magnet 25 in position 1 of ACC. 2 at the 5 time and the subsequent impulse at the 1 time from emitter E3 will interrupt the movement after four steps of advance.

In the same manner as before, the extra 1 will be entered through the 0 impulse from emitter E1 and stopped by the 11 impulse from the emitter E3. In the highest order of the product, there is no R. H. component and the left hand 1 will be entered alone. It will, of course, be understood that the entries of the R. H. components 4, 6 and 8 take place concurrently, followed by the concurrent entry of the 1's in appropriate orders. Following their entry, the usual carry circuits are initiated after which, and at the end of the third cycle, the product accumulator stands at a setting representing the 9's complement of 6312 followed by four 0's.

At the end of this cycle, the multiplier is tested again. As a preliminary, the contacts C8*a* (Fig. 1*f*) close and a circuit extends through the *b* contacts of SH4 (shifted) and *b* contacts of R36 to energize SC4, holding it through contacts C9. Accordingly, when contacts C3 (Fig. 1*c*) close, a circuit is traceable from line 31, contacts C3, *b* contacts of CAL, *e* contacts of Z4, *c* contacts of SC4 (shifted), *c* contacts of Z2, *c* contacts of SC1, *e* contacts of Z1 to the common conducting strip 28 in the third highest order, set at 9, wire 34 (Fig. 1*d*), *b* contacts of BAL, and relay R31 to ground. As explained, the energization of relay R31 indicates that the order tested stands at 9 and will shift the circuit to enable immediate testing of the next lower order. Accordingly, a parallel circuit from contacts C3 extend through the *a* contacts of R31, and thence down through the network to the conducting strip 28 in the fourth highest order in which the brush 26 is now set at 2, thence through the 2 wire 35 (Fig. 1*d*), *j* contacts of BAL, *g* contacts of MP2 (shifted), *w* contacts of BAL, and wire 64 to relay X5, thus selecting the next multiplier digit.

Shortly thereafter, when contacts C4 (Fig. 1*f*) close, a circuit is completed from line 31, contacts C4, *b* contacts of SC4 (shifted), *b* contacts of R31 (shifted), *b* contacts of SC2, *s* contacts of SC1, and relay SH2 to ground. A parallel circuit also extends from contacts C4, *b* contacts of SC1, *g* contacts of SC4 (closed), *d* contacts of R31, and relay SH1 to ground. These two relays SH2 and SH1 call for a three place column shift which will now be held through the fourth calculating or multiplying cycle of operation.

*Fourth cycle*

Now in the fourth cycle, when contacts C17 close, the relay M1 is energized as for the second cycle to condition the accumulator 1 for receiving a 5 in the thousands order. The circuits are also completed through the A2 and A3 relays to condition the related accumulators to receive the complement of 5 times the multiplicand (see Fig. 3). The return circuit for these three relays extends through *r* contacts of X2 (Fig. 1*a*), contacts C14, and *q* contacts of X5 (closed) so that, when contacts C14 open just before the 4 time in the cycle, the M1, A2 and A3 relays will be deenergized and re-energized a cycle point later. The *q* contacts of X5 render the cam contacts C15 ineffective so that the relays remain energized for the period indicated in Fig. 12*b* until contacts C17 open.

*Entering multiplier 5.*—To enter a 5 in accumulator 1, a circuit extends (Fig. 1*e*) from emitter E1, 9 segment, 9 wire 45 (Fig. 1*d*), *m* contacts of X5 (shifted), *a* contacts of INT to the 8 wire 35 (Fig. 1*e*), *a* contacts of DV2, 8 wire 46 to the *e* contacts of CAL, plug socket 47, connection 48, socket 49 (Fig. 1*b*) in the units order of accumulator 1, through the *n* contacts of X10, T and SH4, *n* contacts of SH2 (shifted) and *k* contacts of SH1 (shifted) to the shifted *a* contacts M1 and the start magnet 25 in the fourth highest order of accumulator 1. Later at the 4 time, emitter E3 (Fig. 1*b*) will send an impulse through its 4 segment to the *i* contacts of X5 (shifted) and wire 50 to the stop magnet 25 in this order, thus leaving the wheel advanced five steps. As noted in the example of Fig. 3, no tens carries are involved so that at this time the accumulator 1 is set to represent the complement 9,997,306, and it may also be noted that in this summation the sign of the value has not changed, that is, the setting remains in complementary form.

*Entering 5×789.*—In the product accumulator, the complement of the value 3945 (representing 5 times the multiplicand) is to be entered and the partial products of the true value thereof may be represented as follows:

| | |
|---|---|
| Multiplicand | 789 |
| Multiplier | 5 |
| L. H. component | 344 |
| R. H. component | 505 |
| Product | 3945 |

At the 9 time emitter E1 (Fig. 1*e*) sends an impulse from its 9 segment, 9 wire 45, *b* contacts of X10, *b* contacts of X5 (shifted), *c* contacts of INT to the 0 wire 35 (Fig. 1*e*), *a* contacts of DV2, 0 wire 46, to the 0 segment in the units order and the brush 26 set thereat, thence through *a* contacts of RO4 to the units, socket 54, connection 55, to socket 56 (Fig. 1*b*), then down through the column shift contacts of which the contacts SH2 and SH1 are shifted, down through the *b* contacts of A3 (shifted) to the stop magnet 25 in the thousands order. This impulse is transmitted concurrently with the start impulse from emitter E3 (Fig. 1*b*) at the 9 time, through wire 61 and the A3 contacts (shifted), so that the adding wheel in this order remains at rest.

Figure 11:
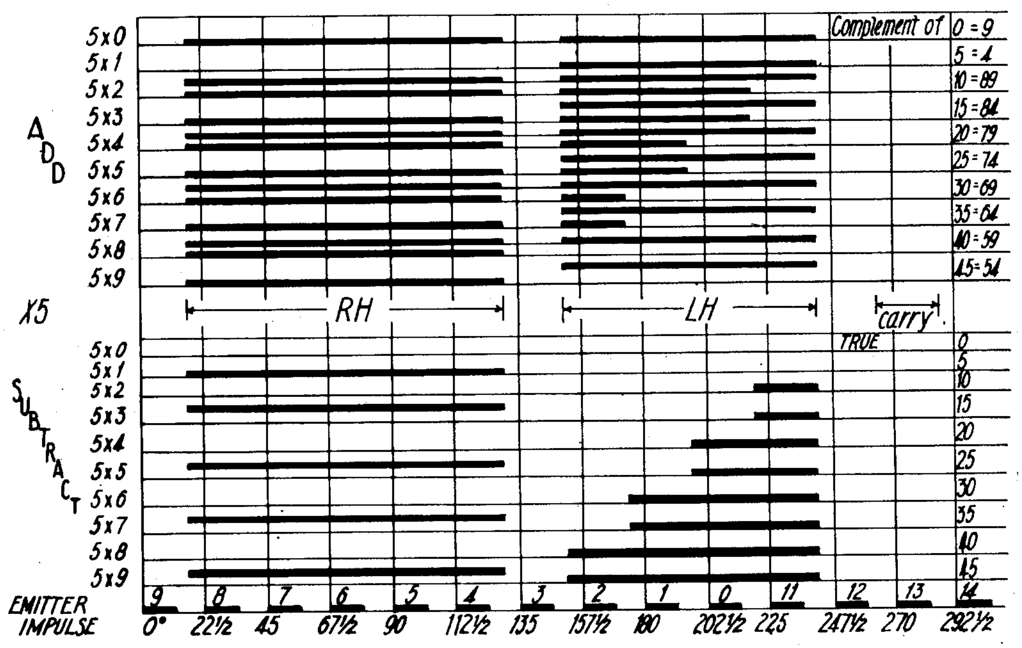
Fig. 11 is a chart showing the period of rotation of the adding wheels when multiplying by 5.

This start impulse is sent to all start magnets of both accumulators 2 and 3. Later in the cycle, that is, at the 3 time, emitter E3 sends a second impulse through the *p* contacts of X5 (shifted), wire 61, to all the start magnets 25 of both the accumulators 2 and 3. In the thousands position, a stop impulse is derived from the 11 segment of the emitter E3, to wire 50, so that in this order the wheel advances four steps (see Fig. 11).

Considering now the tens of thousands order in which the wheel is to be advanced five steps, in this order the 9 impulse from emitter E3 will start rotation of the wheel. There will be no circuit traceable through emitter E1 at the corresponding time and the wheel will consequently advance until the 4 segment of emitter E3 is reached and a stop circuit extended through the *i* contacts of X5 (shifted) to wire 50 and stop magnets 25, so that this wheel advances five steps.

During such advance, when emitter E1 contacts its 8 segment, a circuit extends upwardly through wire 65 to the *s* contacts of X5 to energize the relay X10 which will hold as before. It will be noted in Fig. 12*b* that relay X10 is energized early in the cycle and during the entering period of the R. H. components. However, as noted in Fig. 11, R. H. entering impulses, when multiplying by 5, occur only at the 9 time so that relay X10 may be energized shortly thereafter. Thus, when the brush of emitter E3 contacts its 3 segment, a second start impulse is transmitted to the start magnet in the tens of thousand order. However, with the multiplicand set at 0, there is a simultaneous circuit from emitter E1 from its 3 segment, wire 45 (Fig. 1*d*), *b* contacts of X10 (now shifted), *b* contacts of X5, contacts of INT (shifted), 0 wire 35, *a* contacts of DV2, 0 segment 27 in the units order, *a* contacts of RO4, socket 54, connection 55, socket 56 (Fig. 1*b*), *n* contacts of X10 (now shifted), down through the shifted SH2 and SH1 contacts to the stop magnet 25 in the tens of thousands order, thus preventing any further advance of this wheel beyond the five steps effected in the earlier part of the cycle.

In the hundreds of thousands order, the adding wheel is not to be advanced. In this order the start impulse at 9 time in the cycle is transmitted from the emitter E3, as explained. Concurrently therewith, there is a stop impulse from emitter E1. This circuit is traceable from line 31 (Fig. 1*e*), wire 44, brush of emitter E1 at the 9 segment, 9 wire 45 (Fig. 1*d*), *c* contacts of X10, *d* contacts of X5 (shifted), *a* contacts of INT, 2 wire 35 (Fig. 1*e*), a pair of *a* contacts of relay DV2, 2 wire 46, brush 26 in the hundreds order of accumulator 4 where the brush is set at 2, thence through the *a* contacts of relay RO4 (shifted), plug connection to the 3 socket 56 (Fig. 1*b*) (not shown), thence through the column shift contacts of which SH2 and SH1 are shifted to the stop magnet 25 in the column 6 position, thus rendering the concurrent start impulse from emitter E3 ineffective.

At the 3 time in the cycle, the emitter E3 sends a second start impulse (after relay X10 has been energized for column shift as explained), so that at this time all the adding wheels receive the start impulse. In the hundreds of thousands order, there is a concurrent stop impulse from emitter E1 traceable from the 3 segment thereof (Fig. 1*e*) to the 3 wire 45 (Fig 1*d*), *c* contacts of relay X5 (shifted), *a* contacts of INT, 1 wire 35 (Fig. 1*e*), a pair of *a* contacts of relay DV2, 1 wire 46, the brush 26 in the tens column of the accumulator 4, *a* contacts of RO4 and plug connection to the 2 socket 56 (Fig. 1*b*), thence down through the shifted X10, SH2, and SH1 contacts to the stop magnet 25 of column 6 to prevent rotation in this order and accordingly the related wheel remains at rest throughout the entering operation.

In the next higher order, a 6 is to be entered. As before, the start impulse is transmitted at the 9 time in the cycle and, since no stop signal is directed thereto, the wheel advances until the automatic stop impulse is transmitted at the 4 time in the cycle from the emitter E3. The circuits involved are the same as explained for entering the 5 in the tens of thousands order. At the 3 time, the start magnet receives a second impulse from emitter E3 and one step later at the 2 time a circuit is transmitted from emitter 1, its 2 segment, 2 wire 45 (Fig. 1d), c contacts of X10 (shifted), d contacts of X5 (shifted), a contacts of INT, 2 wire 35 (Fig. 1e), a contacts of relay DV2, 2 wire 46, brush 26, in the hundreds order of accumulator 4, a contacts of relay RO4 (shifted), to the 3 socket 56 (Fig. 1b), thence through the column shift contacts of which SH2 and SH1 are shifted, to the stop magnet 25 in column 1 of accumulator 2, so that the wheel thereof is stopped after the additional step of movement.

In all other orders the wheels are set in motion through the start impulse from emitter E3 at the 9 time and automatically stopped at the 4 time to effect a 5 entry in each wheel. Thereafter, the wheels are restarted at the 3 time and again stopped at the 11 time to enter the second step of 4. At the tens carry part of the cycle the usual high to low order carry takes place along with carries from lower to higher orders leaving the product accumulator standing at 999,932,934,999.

As indicated in Fig. 12b, the relays SC2 and SC1 are energized through the circuits in Fig. 1f. Following this, relays SH2 and SH1 are deenergized along with relay X5. The new test is effected upon closure of contacts C3 (Fig. 1c) and as indicated in Figs. 2 and 3 the digit tested is a 2, resulting in energization of relay X2 followed by reenergization of relays SH2 and SH1, so that at the end of the fourth cycle the relays will be energized or deenergized in accordance with the diagram in Fig. 12b, and operations will proceed through the cycle 5 in the same manner as explained in connection with the third cycle.

From this point on, testing, multiplier selection and column shift control operations follow as indicated in Figs. 2 and 3 until ultimately in the eleventh cycle multiplying is effected by the digit 2 with none of the SC or SH relays energized. It will be noted that the sign of the multiplier has become negative, so that the balance relay BAL is energized (see Fig. 12b) and relays A1, M2, M3 and RO4 are also energized. Under these conditions, multiplying proceeds resulting in the entry of 1578 in accumulator 3 and the complement of 2 in accumulator 1, so that the latter now contains 9's in all orders and the product accumulator contains the complement of the final product.

When contacts C3 now close, the relay R31 will be energized as before but no multiplying relay will be energized. Accordingly, the circuit through the interlock relay INT will not drop out upon opening of the contacts C12 (Fig. 1e) but will remain energized through the s contacts of X1, u contacts of X2, and m contacts of X5 in series for the period indicated in Fig. 12b. Therefore, when emitter E1 transmits an impulse to its 16 segment in the eleventh cycle, a circuit is traceable from wire 44 (Fig. 1e), the 16 segment of E1, uppermost wire 45 (Fig. 1d), b contacts of relay INT (shifted), relay R35 to ground. The relay R36 closes its a contacts to provide a holding circuit through contacts C7. In Fig. 1f, relay R36 opens its f contacts and, since none of the SH relays are energized at this time and the balance relay BAL is also deenergized, the holding circuit for relays MP1 and CAL will be broken when contacts C11 open. Relay R36 also closes a pair of g contacts to complete a circuit through contacts C11, e contacts of SH4, f contacts of SH2, f contacts of SH1, g contacts of R36, s contacts of BAL, c contacts of MP1 to a signal lamp 70 which will be lighted for the period that contacts C11 are closed and serves as an indication that the multiplying operation has been completed. Following this, the machine will simply operate idly while retaining the result in the product accumulator.

It is to be noted that during the multiplying operation at any testing period, the 2 columns tested at such time may both be set at 9 and as a result the R31 relay will be energized but none of the multiplying relays will be picked up, and as a result relay R36 will be energized as explained for the last cycle. However, this will not interrupt operation of the machine inasmuch as at such time one or more of the SH relays will be in energized condition to prevent the dropping out of the holding circuits in Fig. 1f to the MP1 and CAL relays. During the cycle, the setting of the SC relays will be transferred to the SH relays and, since relay R31 will have been energized, this transfer from the SC relays to the SH relays will be one unit lower in value. For example, if at the testing time relay SC4 had been energized, the transfer will result in energization of relays SH2 and SH1. Then, later in the cycle, these SH relays will retransfer the setting back to the SC relays with a further drop of one step to energize relay SC2. There is thus an automatic shift of two columns upon the sensing of 9's in the two orders tested.

Briefly reviewing the underlying multiplying principles, when the X1 relay is energized to call for multiplying by 1 and the accumulator controlling relays A and M are conditioned for adding, impulses are transmitted from emitter E3 at the 9 time to initiate rotation of all the adding wheels. Their interruption is subsequently controlled through the impulses from emitter E1 directed through normally closed contacts of relay X2 and the readout devices 26, 27, 28 of accumulator 4 to stop the wheels at differential times in accordance with the setting of accumulator 4. Where no stopping impulse is transmitted from accumulator 4, a 0 stop impulse from emitter E3 will be effective. It will be noted in Fig. 1b that emitter E3 also transmits a stop impulse at the 11 time but, when multiplying by the digit 1, this is an ineffective impulse. The carry start impulse is transmitted at the 12 time and the carry stop impulse at the 13 time. This carry start and stop will be effective for all multiplying conditions.

When relay X2 is energized and adding is called for, the same start impulse at the 9 time from emitter E3 is effective to start the wheels in rotation, and they will advance for a maximum of 8 steps during which all possible R. H. components of partial products are entered, that is, the digits 2, 4, 6 or 8 may be transmitted from accumulator 4 and controlled by impulses from emitter E1 directed through the contacts of relay X2 of Fig. 1*d*. These impulses, it will be noted, occur at the 7, 5, 3 or 1 points in the cycle which, it will be observed, are 2, 4, 6 and 8 steps, respectively, after the starting time of 9. If no such stop impulse is transmitted through the accumulator 4, the automatic stop impulse will be directed from emitter E3 at the 1 time, that is, 8 steps after the start impulse. To provide for the left hand components of partial products, which is the digit 1 when multiplying by 2, the emitter E3 transmits a start impulse at the 0 time and a stop impulse one step later at the 11 time to advance the wheels one step. Where no advance is desired, there will, of course, be a stop impulse directed through accumulator 4 to render the starting impulse ineffective.

When relay X5 is energized and the accumulator is conditioned for adding, the starting impulse at 9 is again effective and this time the automatic stop impulse is conditioned to occur at the 4 time, that is, for a total of five steps of movement. When multiplying by 5 the right hand components of partial products will be either 5 or 0 and, if the start impulse is not rendered ineffective, the wheels advance five steps to enter the R. H. components. The restarting impulse is transmitted at the 3 time and the second stop impulse is transmitted at the 11 time, which is 4 steps later, during which time differential impulses may be transmitted to stop after 1, 2 or 3 steps. If not stopped, the 4 step advance is taken.

*Dividing problem*

Figures 4, 5:
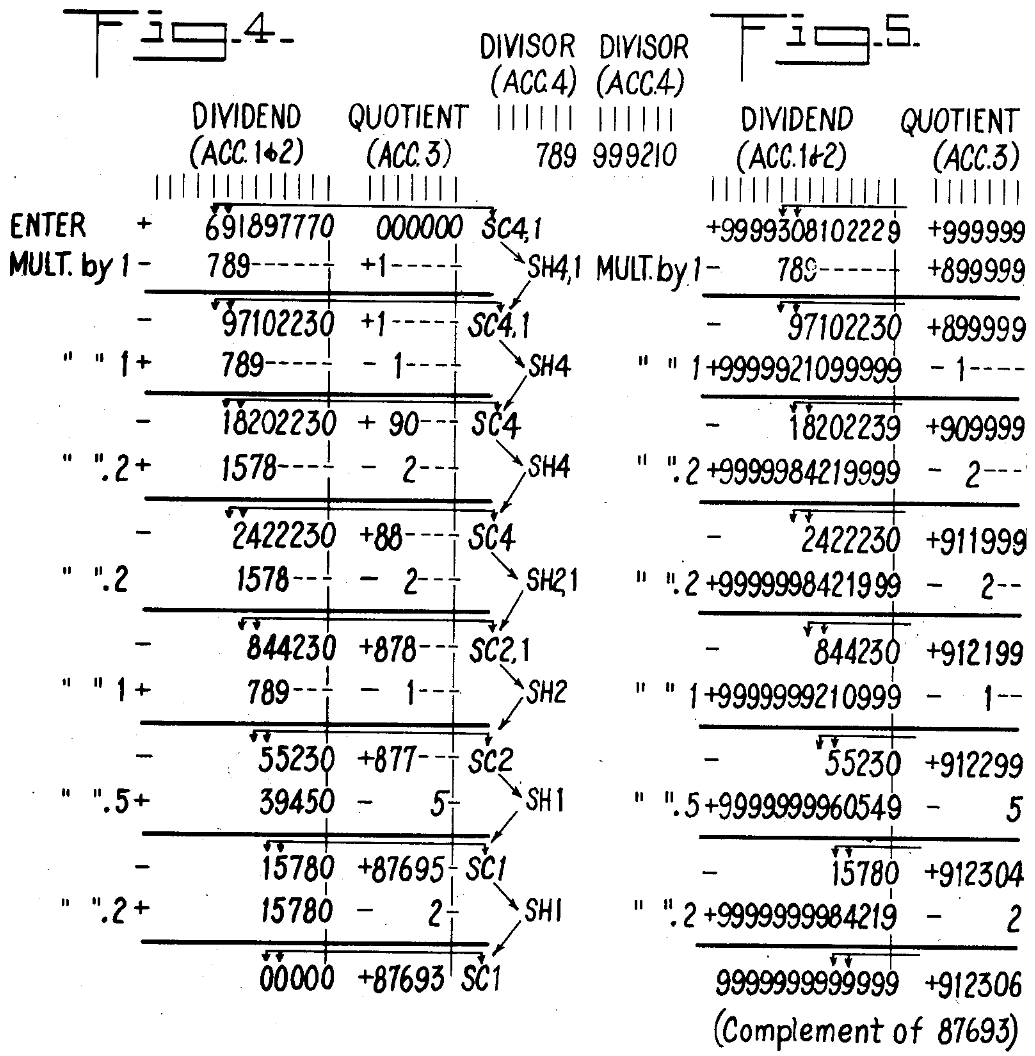

Fig. 4 represents the mathematical procedure in handling the dividing problem of 69,189,777 divided by 789. Here the dividend is entered in the dividend accumulator, the divisor is entered in the divisor accumulator and the quotient accumulator will build up the result. In the method followed, the dividend will be repeatedly reduced by either the 2 or 5 multiple of the divisor or by 1 times the divisor. Also, in certain cases the 2 and 5 times multiples are subtracted from the dividend with a column shift to the right to in effect reduce the dividend by 0.2 or 0.5 of the divisor.

Referring to Figs. 4 and 5, the former shows the mathematical steps involved in a representative problem while Fig. 5 shows the settings of the various accumulator wheels in the actual machine. After the dividend and divisor have been entered in their respective accumulators, a comparison is made between the highest ordered digit in the dividend and the highest ordered digit of the divisor, and in accordance with such comparison a trial quotient digit is selected which will be either 1, 2 or 5. The determination of which digit is selected will be in accordance with the table of Fig. 6 from which it is observed that with a dividend digit of 6 and a divisor digit of 7 a trial quotient digit of 1 is selected. Accordingly, for the example chosen, the selection of 1 results in subtracting 1 times the divisor from the dividend and adding a 1 in the quotient accumulator with appropriate denominational allocation as will be explained in connection with the circuit diagram.

Following the algebraic summation of the values, a second test or comparison between the 9 of the dividend remainder and the 7 of the divisor results in a second selection of 1 (see Fig. 6), so that summation again occurs with a column shift to the right. A third test between the dividend remainder digit 1 and the divisor digit 7 selects the trial quotient .2 with accompanying column shift. This procedure follows through successive cycles until the quotient has been obtained to a desired extent.

*First cycle*

Referring now to the circuit diagram (Fig. 1*f*), closure of the divide contacts 71 will cause energization of the divide relay DV1 through the contacts C16, and this relay through its *c* contacts will energize calculating relay CAL and also through its *b* contacts will energize relay R23. These circuits are similar to those explained for the multiplying operation and as indicated in the timing diagram (Fig. 13*a*). Relays DV1 and CAL will remain energized throughout dividing operations and will be held through the wire 33 and the *f* contacts of relay R36, as for multiplying. With relay R23 energized, the relays SC4 and SC1 will be energized upon closure of contacts C8 in the same manner as explained for multiplying through the *c* and *b* contacts of relay R23. This, as explained, provides for the preliminary testing of the 2 highest positions of the dividend accumulator.

*Zero test circuits.*—For dividing, there is a modification of the testing orders which is dependent upon the size of the divisor. In Fig. 1*e* a set of relays Z1, Z2 and Z4 is provided of which relays Z1 and Z4 will energize together for a 1 place divisor; Z4 will be energized for a 2 place divisor; Z1 and Z2 for a 3 place divisor; Z2 for a 4 place divisor; Z1 for a 5 place divisor, and none of the relays will be energized if the divisor contains 6 places. For the present example, the divisor contains 3 places. A circuit will be traceable in Fig. 1*e* upon closure of contacts C1 through a circuit from line 31, contacts C1, *f* contacts of relay DV1 (closed), 9 segment 27 in the highest order of the divisor accumulator 4, then in series through the 3 brushes 26 in the 3 highest orders (set at 9), *c* contacts of relay Z4, and relay Z2 to ground. The relay Z2 shifts its *a* contacts so that a parallel circuit extends from the 9 segment of the third highest column through *b* contacts of relay Z4, *a* contacts of relay Z2 to relay Z1 and ground. This energization occurs at the time indicated in Fig. 13*a* and will be repeated at the same time in each subsequent cycle throughout the dividing operations as is also indicated.

In Fig. 1*c* the Z relays control contacts in the testing circuits so that for the present example the relays Z1 and Z2 are energized in addition to the relays SC4 and SC1. The initial testing circuit is traceable from line 31, contacts C3, *b* contacts of CAL, *e* contacts of Z4, *c* contacts of SC4 (shifted), *c* contacts of Z2 (shifted), *e* contacts of SC2, *e* contacts of SC1 (shifted), *f* contacts of Z1 (shifted), to the conductor 28 in the fifth highest order of accumulator 1 (in this order the brush 26 is set at the 3 position, see Fig. 5), 3 wire 35 (Fig. 1*d*), *i* contacts of relay BAL, *f* contacts of relay D7 closed, as will be presently explained, thence through the wire 72 emphasized in Fig. 1*d*, wire 73 to the relay X1 and ground.

The relay D7 was energized as follows. Concurrently with the energization of the Z relays, contacts C1 upon closure (Fig. 1*e*) complete a circuit from line 31, contacts C1, *g* contacts of relay DV1, to relay DV2 which will shift its *a* contacts and also close a pair of *d* contacts in the lower part of Fig. 1*e* so that later, when contacts C2 close, a circuit is completed from line 31, contacts C2, *d* contacts of DV2 (shifted), *d* contacts of Z4, *b* contacts of Z2 (shifted), *b* contacts of Z1 (shifted), *a* contacts of relay RO4 (third from the right), conductor 28 in the hundreds order, brush 26 set at 2 (representing the true divisor 7), 2 wire 46, *a* contacts of DV2 (shifted), to the 7 wire of the group designated 74 (Fig. 1*d*) and relay D7 to ground. Inspection will show that with the brush 26 set in other digital positions the relays prefixed D will be energized correspondingly with the exception that relay D7 is energized for a true setting of both 7 and 8. As indicated in the timing diagram (Fig. 13*a*) relays DV2 and D7 are repeatedly energized each cycle during the testing period.

For dividing operations the connections for conditioning the accumulators to receive entries is the same as for multiplying for accumulators 1 and 3. For accumulator 2, a plug connection is made from socket 40 (Fig. 1*b*) to the socket 42 designated with a minus sign instead of plus. With this variation when contacts C17 (Fig. 1*b*) close, the relays M1, M2 and A3 will be energized along with relay RO4 in the same manner as explained for multiplying and at the time indicated in the diagram (Fig. 13*a*).

Near the end of the first cycle, contacts C4 (Fig. 1*f*) close to energize relays SH4 and SH1 through the contacts of the relays SC2 and SC1, in accordance with the principles explained in connection with multiplying, that is, the setting of the SC relays is transferred to the corresponding SH relays where the first digit tested has a true significant value.

*Entering quotient digit 1.*—Operations now proceed to multiply the divisor by 1 and enter 789 as indicated in Fig. 4 and enter the quotient digit 1 into the quotient accumulator. Tracing the circuit for the latter, it extends to the emitter E3 (Fig. 1*b*) which transmits a start impulse at 9 time, through wire 61 and closed *a* contacts of relay A3 to all the start magnets 25 of accumulator 3 as for multiplying, so that all the wheels commence rotation. In the highest order position, a stop circuit is completed after one step of movement which is traceable from line 31 (Fig. 1*e*), wire 44, brush of emitter E1 when in contact with the 1 segment, 1 wire 45 (Fig. 1*d*), *m* contacts of X2, *m* contacts of X5, *a* contacts of INT, 8 wire 35 (Fig. 1*e*), right hand *a* contacts of DV2, 8 wire 46, *e* contacts of CAL, socket 47, a plug connection now made from this socket to the 1 socket 56 of accumulator 3 (Fig. 1*b*). From here the circuit extends through *n* contacts of X10, *n* contacts of T, *n* contacts of SH4 (shifted), *i* contacts of SH2, *i* contacts of SH1 (shifted), *b* contacts of A3 (shifted), stop magnet 25 in the sixth order, to ground.

*Entering 1×789.*—In the dividend accumulator the divisor will be entered in the orders indicated in Figs. 4 and 5 through circuits of which that for the units order digit 9 is traceable as follows. Referring to Fig. 1*e*, at the 9 point in the cycle a circuit is traceable from line 31 to the 9 segment of E1, the 9 wire 45 (Fig. 1*d*), *b* contacts of X2, *b* contacts of X5, *a* contacts of INT, 0 wire 35 (Fig. 1*e*), left hand *a* contacts DV2, 0 wire 46, brush 26 in the units order (set at 0), conductor 28, right hand *a* contacts of RO4 (shifted), socket 54, plug connection to the socket 75 of accumulator 2 (Fig. 1*a*) in the column designated 2, thence through *m* contacts of X10, *m* contacts of T, *m* contacts of SH4 (shifted) (traceable on accumulator 1), *h* contacts of SH2, *h* contacts of SH1 (accumulator 2, shifted), *a* contacts of relay M1, column 1 of accumulator 1, start magnet 25 to ground.

Accordingly, the adding wheel in the first order of accumulator 1 commences to rotate, and after nine steps the stop impulse will be transmitted from the 0 segment of emitter E3 (Fig. 1*b*) to *h* contacts of X5, *h* contacts of X2, *i* contacts of X2, *i* contacts of X5, and wire 50 to the stop magnet 25, which impulse incidentally energizes all the stop magnets in the accumulators 1 and 2 through the *b* contacts of the A1 and A2 relays. In the two highest orders, the start impulse will have been transmitted at the 7 and 8 points in the cycle, respectively, so that in these orders the advance will have been 7 and 8 steps, respectively.

Following the entering period of the cycle, the usual 10's carry takes place in the same manner as explained for multiplying and also in the latter part of the cycle closure of contacts C8*a* will transfer the setting from the SH4 and 1 relays to the corresponding SC relays.

*Balance test circuit.*—It will be noted in Figs. 4 and 5 that as a result of the entry of 1 times the divisor the algebraic sign of the result has changed from positive to negative indicating an overdraft. This condition is detected in a manner explained for multiplying. Briefly, the tens carry impulse from the 12 segment of emitter E3 (Fig. 1*b*) extends through wire 51, through the 10's carry contact 22 in the 9th order from the right of the dividend (order 3 of accumulator 1), thence through the 9's carry contacts 21 in higher order to wire 52 (Fig. 1*a*), and back (Figs. 1*b* and 1*c*) to the 9 segment 27 in the highest order of the dividend accumulator, its brush 26, conductor 28, contacts C5, to the balance relay BAL. As indicated in Fig. 13*a*, this relay will now be held through contacts C10 for the period indicated. The effect of this is to shift the related *p* and *q* contacts in Figs. 1*a* and 1*b* so that the dividend and quotient accumulators will now receive the next entries complementarily.

Later in the cycle, after relays Z1, Z2, DV2 and D7 are energized, contacts C4 through familiar circuits transfer the setting of the SC relays to the SH4 and SH1 relays which will, as indicated in Fig. 4, adjust the shift control circuits in Fig. 1*c* so that the same positions of the dividend accumulators will be tested as during the preceding cycle. This test will find a zero in the higher order tested, resulting in the energization of relay R31 through a circuit from the conductor 28 in the fifth highest order (Fig. 1*c*), brush 26 set at 0, 0 wire 35 (Fig. 1*d*), *c* contacts of INT (shifted), *b* contacts of BAL (shifted), and relay R31 to ground. As a result, the *a* contacts of this relay close in Fig. 1*c* to direct the testing circuit to the conductor 28 in the sixth highest order where the brush is set at 9 and the circuit will extend along the wire 34 (Fig. 1*d*) through the *r* contacts of BAL (shifted), *k* contacts of D7 (shifted), thence through the wires 72 and 73 to the X1 relay.

*Third cycle*

Multiplying now proceeds as for cycle 2 with the difference that the entries are now made 1 column to the right inasmuch as only the one shift relay SH4 is now in energized position. At the carry time of this cycle, the balance relay will again be energized since the summation taking place has not changed the algebraic sign of the remainder. Near the end of the third cycle, the testing circuit finds a 1 setting in the higher order tested and the circuit will extend through the 1 wire 35 (Figs. 1*c* and 1*d*), *d* contacts of BAL (shifted), *a* contacts of D7 (shifted), wire 77, relay TP to ground. This relay closes its *d* contacts so that the circuit branches from wire 77, through the *d* contacts of TP, *m* contacts of SC4 (shifted), and relay X2 to ground. From the table in Fig. 6 it is seen that a multiplier of 2 tenths is called for. This is evidenced in the circuit by the energizing of relay TP along with the X2 relay.

When contacts C7 close (Fig. 1*d*) a circuit is completed from line 31, contacts C7, *a* contacts of relay TP (now closed), *e* contacts of relay R36 and relay T to ground. The relay closes its *a* contacts to hold through the contacts C7. The relay T will accordingly remain energized along with the relay X2 and the net effect will be to cause a shift of contacts controlled by the T relay in Figs. 1*a* and 1*b*, so that the entries made will be shifted 1 column toward the right from the positions that they would take without relay T energized.

*Fourth cycle*

During the fourth cycle entries of 2 times the divisor will be made in the dividend accumulator and a 2 will be entered in the quotient accumulator in the position shown in Fig. 5, through circuits similar to those already traced. In the same manner as for multiplying, when the X2 relay is energized, the start and stop timing is altered in accordance with Fig. 10 to effect separate entries of the R. H. components followed by entry of the L. H. components during the same cycle. Near the end of the fourth cycle, as represented in Fig. 13*b*, relay SC4 is again energized and SH4 is dropped out and later relays SH2 and SH1 are picked up. The test circuit at the carry time has again energized the balance relay BAL, and during the testing time relays X2 and TP are energized with the resulting energization of the relay T.

*Fifth cycle*

The fifth and subsequent cycles will proceed as represented in Figs. 4 and 5 where the order in which the SC and SH relays are energized and the digits selected for multiplying in the subsequent cycles are indicated, so that at the end of the 8th cycle the quotient accumulator will stand at 912,306 and the dividend accumulator contain 9's in all orders.

*Eighth cycle*

At the test time in the eighth cycle, the two orders tested both stand at 9 so that, in the same manner as for multiplying, relay R36 will be energized and held through contacts C7. The failure to energize one of the multiplying relays will result in the holding over of the interlock relay INT into the ninth cycle in the same manner as explained for multiplying, so that with relay R36 energized its *f* contacts in Fig. 1*f* are open to enable contacts C11 to open the holding circuits of the relays DV1 and CAL at the time indicated in Fig. 13*b*. At the same time the signal circuit is completed through contacts C11, the *e* contacts of SH4, *f* contacts of SH2, *f* contacts of SH1, *g* contacts of R36, *s* contacts of BAL, *e* contacts of DV1, and plug connection to a signal lamp 78. As a result, further operations are suppressed and the machine operates idly with the result standing on the dividend quotient accumulator as indicated in Fig. 5.

These results are represented on the readout devices in Figs. 1*c* and 1*e* by the position of the brushes 26, and by means of well known readout devices these results may be read out to control recording devices if so desired or the adding wheels may be provided with indications thereon to represent their positions. For simplicity in the disclosure, the automatc reading of the results has not been shown. For the same reasons, the automatic resetting of the accumulators has been omitted and it may be assumed that resetting is effected by manually advancing the reading brushes to their initial setting of 9 in all orders.

Fig. 14 represents the mathematical procedure followed by the machine when a selection is made of the quotient digit in the units or lowest order and where the digit initially selected must be supplemented to obtain the ultimate digit in the units order. The condition is illustrated by assuming the value 33,780 standing in the dividend accumulator and a divisor of 789, and shift control relay SC1 is energized at the testing period of a cycle so that the test is made through the highest order position of the dividend to compare the dividend digit 3 with the divisor digit 7 which, according to the table of Fig. 6, calls for a quotient digit of .5. Tracing the selecting circuit specifically, it extends from the conductor 28 in the eighth highest order of the dividend accumulator (Fig. 1*c*) to the 6 wire 35 (Fig. 1*d*), *f* contacts of BAL, *c* contacts of D7, wire 80 and relay TP to ground. A parallel circuit extends from the wire 80, through the *b* contacts of TP, *k* contacts of SC4, *s* contacts of SC2, *p* contacts of SC1 (shifted), *f* contacts of R31, relay X5 to ground. Thus, relay X5 is energized through the contacts of relay TP (shifted).

The resulting entering circuits will direct the digit 5 into the units order of the quotient accumulator and will enter the value 3945 subtractively into the dividend accumulator to obtain the remainder 5670. It will be noted that at the 10's carry time the balance relay BAL will be energized, as already explained, in anticipation of the change of sign in the dividend. The SC1 relay is now energized for a further test and this time the order tested contains 0, resulting in energization of relay R31 in the now familiar manner so that the next lower position is sensed with a 5 standing therein. The comparison of this digit with the 7 of the divisor will result in circuits the same as for the prior selection, extending from the ninth highest conductor 28 of Fig. 1*c*, through the 5 wire 35 (Fig. 1*d*), *h* contacts of BAL (shifted), *e* contacts of D7, wire 80, relay TP to ground. The parallel circuit from wire 80 extends through the *b* contacts of TP, *k* contacts of SC4, *s* contacts of SC2, *p* contacts of SC1 (shifted), *f* contacts of R31 (now shifted), *c* contacts of TP (shifted), relay R36 to ground. It will be noted that the circuit from wire 80 in the previous step caused energization of relays TP and X5. In the present step, with relay R31 energized the circuit from wire 80 energizes the relays TP and R36 and does not energize the X5 relay. Accordingly, since none of the multiplying relays are energized, the cycle is an idle one with no entries being made into the quotient or dividend accumulator and during this cycle relay SC1 is deenergized and none of the shift relays SH are reenergized so that, when the next test is made, none of the shift control relays energize. The test circuit again extends through the 5 wire 35 to the wire 80 (Fig. 1*d*) as before to energize relay TP. The branch circuit from wire 80 now extends through the *b* contacts of TP, *k* contacts of SC4, *s* contacts of SC2, *p* contacts of SC1, *c* contacts of TP, and relay R36. This circuit also branches from the c contacts of TP down through the c contacts of relay BAL shifted, t contacts of SC4, SC2, SC1 in series, relay X1 to ground.

Briefly, under the condition where none of the SC relays is energized and the BAL relay is energized (that is, the trial quotient digit lies in the tenths areas of the table, Fig. 6), the relays X1 and R36 will be energized so that in the ensuing cycle 1 times the divisor is entered into the dividend accumulator and a 1 is entered in the quotient accumulator to obtain the result indicated on the last line of Fig. 14. With relay R36 energized and none of the SH relays energized, the holding circuit for the divide and calculate relays will be broken upon opening of the contacts C11 so further operations will be interrupted.

Fig. 14 illustrates a particular condition wherein the balance relay BAL is energized through a different circuit than previously explained. It will be recalled that this relay is energized through the 10's carry circuit branching through the highest order of the dividend accumulator when the brush thereof is set at 9. In Fig. 14 it will be noted that during the idle cycle, when no entries are made, there will accordingly be no 10's carry, so that the former pickup circuit for the balance relay will not be completed. During this cycle the highest order of the dividend accumulator has its brush standing at 0, since the dividend remainder has a negative value, and at the carry point in the cycle the brush of emitter E2 (Fig. 1c) will contact the 12 segment and complete a circuit from line 31, wire 82, wiper of the emitter E2, and segment 12, wire 83, 0 segment 27 in the highest order of the dividend accumulator, brush 26, conductor 28, contacts C5, balance relay BAL, to ground.

Fig. 15 represents a further example. In this example the initial comparison between the 3 in the highest order of the dividend and the divisor digit 7 selects the X5 relay resulting in the familiar entries to reduce the dividend to a negative 790 which is then tested with the result that relay R31 is energized and the test through the next lower order will extend through the 7 wire 35 (Fig. 1d), j contacts of relay BAL, g contacts of relay D7, wire 72 and 73 which extends to relay X1 and results in the entry of the divisor into the dividend accumulator, as indicated. During this cycle, the relay SC1 is deenergized, so that on the next test a comparison circuit extends through the 0 wire 35, c contacts of INT (shifted), b contacts of BAL (shifted), to relay R31. Relay R31 closes its u contacts so that a branch circuit extends from the b contacts of BAL through the u contacts of BAL, u contacts of relays SC4, SC2 and SC1 in series, u contacts of R31 (now closed), relay X1 and ground. This circuit also branches from the u contacts of R31 down through the t contacts of SC1, SC2 and SC4 in series, c contacts of BAL to relay R36. Accordingly, the machine goes through a multiplying cycle during which 1 times the divisor is entered in the dividend accumulator and a 1 is subtracted from the quotient accumulator, as indicated in Fig. 15. As explained previously, with relay R36 energized and none of the SH relays energized, the circuits to the dividing and calculating relays will be interrupted to discontinue calculating operations. It is to be noted that for the last condition of testing the 0 setting in the left hand order tested controls the energization of R31, X1 and R36, and that the relay R31 as a result will have closed its a contacts (Fig. 1c). However, the test through these contacts is rendered ineffective at this time when none of the SC relays is in energized condition, so that the related w contacts (Fig. 1c) will all be open to prevent completion of any circuits through the next lower order.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a cyclically operable calculating machine, an accumulator settable to represent a dividend, an entry receiving device settable to represent a divisor, column shift devices, cyclically operable means under control of the divisor receiving device for entering 1, 2 or 5 times the divisor subtractively into the dividend accumulator through said column shift devices, means for causing said cyclically operable entering means to perform successive subtractive entering operations, means jointly controlled by the accumulator and the entry receiving device and effective for each cycle for comparing the highest ordered divisor digit with the highest ordered digit in the dividend accumulator, and means controlled in accordance with said comparison for selecting 1, 2 or 5 times the divisor during the related entering operation.

2. The invention set forth in claim 1 in which overdraft detecting means is provided under control of the accumulator and effective upon occurrence of an overdraft for changing the operation of said entering means to cause addition of the selected divisor multiple during the related entering operation.

3. The invention set forth in claim 1 in which means is provided for ascertaining whether the amount in the accumulator is a positive or negative amount, and means controlled thereby in each cycle for controlling the operation of the entering means to cause addition of the selected divisor multiple when the amount is negative and to cause subtraction when the amount is positive.

4. In a dividing machine, an accumulator settable to represent a dividend, conditioning means for causing the accumulator to effect addition or subtraction, an overdraft device controlled by the accumulator, divisor entering means controlled to enter a divisor multiple in said accumulator, means jointly controlled by the highest order of the accumulator and the divisor entering means for selecting the divisor multiple to be entered, said accumulator being conditioned to receive said multiple subtractively, and means controlled by said overdraft device for causing said divisor entering means to enter a second multiple of the divisor selected jointly by the accumulator and the divisor entering means and for causing said conditioning means to condition the accumulator to receive said entry additively.

5. In a machine of the class described, an accumulator settable to represent an amount, an entry receiving device settable to represent another amount, conditioning means for causing the accumulator to effect addition or subtraction, an overdraft device controlled by the accumulator, entering means controlled to enter a second amount in said accumulator, means jointly controlled by the highest order of the accumulator and said entry receiving device for selecting the second amount to be entered, said accumulator being conditioned to receive said second amount subtractively, and means controlled by said overdraft device for causing said entering means to enter a third amount selected jointly by the accumulator and said entry receiving device and for causing said conditioning means to condition the accumulator to receive said third amount additively.

6. In a calculating machine, an accumulator settable to represent a multidenominational dividend, an entry receiving device settable to represent a divisor, column selecting devices, comparing means controlled jointly by said accumulator and said entry receiving device through said column selecting devices to select a trial quotient digit of only 1, 2 or 5 in accordance with a predetermined comparative relationship between the highest ordered significant digit of the dividend and the highest ordered significant digit of the divisor, column shift devices, multiplying mechanism controlled jointly by said comparing means and said entry receiving device for controlling said accumulator through said column shift devices to enter in the highest orders thereof the product of 1, 2 or 5 times the divisor, means normally effective for causing said entry to be made subtractively, and control means for causing repeated operation of the comparing mechanism to select a further trial quotient digit of 1, 2 or 5 in accordance with the relationship between the highest ordered significant digit of the dividend remainder and the highest ordered significant digit of the divisor and for effecting repeated operation of the multiplying mechanism accordingly.

7. In a dividing machine, an accumulator having ordered elements, a settable device having similarly ordered elements, the elements of both the accumulator and the device being settable to represent, respectively, a dividend and a divisor, comparing means for selecting the element of the accumulator and of the settable device respectively containing the highest ordered significant digit and comparing these digits, operating means therefor, multiplying mechanism for multiplying the divisor by a number of digits less than all of the digits and for causing a product entry into the accumulator, means controlled by said comparing means for rendering said multiplying mechanism effective to selectively multiply by one of said number of digits in accordance with a predetermined relative magnitude of the compared digits, means controlled by the accumulator for manifesting the kind of amount therein, means for selectively causing the accumulator to receive an entry additively or subtractively, and means controlled by said manifesting means for rendering said last named means effective to add the product when the dividend is negative and to subtract the product when the dividend is positive.

8. In a cyclically operable dividing machine, an accumulator having ordered elements, a settable device having similarly ordered elements, the elements of both the accumulator and the device being settable to represent, respectively, a dividend and a divisor, comparing means and means for rendering the same effective each cycle for selecting the element of the accumulator and of the settable device respectively containing the highest ordered significant digit and comparing these digits, operating means therefor, multiplying mechanism for multiplying the divisor by only one of the digits 1, 2 or 5 for each cycle and for causing entry of the resulting product into the accumulator, and means controlled by said comparing means for rendering said multiplying mechanism effective to selectively multiply by said one digit in accordance with a predetermined relative magnitude of the compared digits.

9. The invention set forth in claim 8 in which the accumulator is cyclically operable with an entering period and a tens carry period, and in which the multiplying mechanism comprises devices controlled by the divisor device for forming right and left hand components of partial products in succession and for causing entry thereof in succession during the entering period of the accumulator and prior to the tens carry period.

10. In a calculating machine, a cyclically operable accumulator having a plurality of denominationally ordered elements, driving means therefor, start and stop devices for effecting coupling and uncoupling between said elements and said driving means, control means for operating the start devices at differential times in a cycle to initiate advance of selected elements, cyclically operable control means for operating all the stop devices at a purality of different predetermined times in the cycle to terminate the advance of all elements, and means controlled by the highest denominational order of the accumulator for rendering said last named means effective at a selected one of said times.

11. In a calculating machine, a cyclically operable accumulator having a plurality of denominationally ordered elements, driving means therefor, start and stop devices for effecting coupling and uncoupling between said elements and said driving means, control means for operating the start devices at differential times in a cycle to initiate advance of selected elements, cyclically operable control means for operating all the stop devices at a plurality of different predetermined times in the cycle to terminate the advance of all elements, means for ascertaining the value of the highest ordered digit in the accumulator, and means controlled thereby for rendering the stop control means effective at a time determined by the value of said digit.

12. In a calculating machine, a cyclically operable accumulator having a plurality of denominationally ordered elements, each with ten rotative positions, a first control means effective during a single cycle for effecting a selective advance of an element through 1 to 8 rotative positions, then a selective advance through one position and then a selective tens carry advance, a second control means effective during a single cycle for effecting a selective advance of an element through five positions, then a selective advance through one to four positions and then a selective tens carry advance, operation selecting means, and means controlled thereby for selectively rendering said first and second control means effective.

13. In a calculating machine, a cyclically operable accumulator having a plurality of denominationally ordered elements, each with ten rotative positions, a first control means effective during a single cycle for effecting a selective advance of an element through 1 to 8 rotative positions, then a selective advance through one position and then a selective tens carry advance, a second control means effective during a single cycle for effecting a selective advance of an element through five positions, then a selective advance through one to four positions and then a selective tens carry advance, a third control means effective during a single cycle for effecting a selective advance of an element through one to nine rotative positions, and then a selective tens carry advance, operation selecting means, and means controlled thereby for selectively rendering one of said first, second or third control means effective.

14. The invention set forth in claim 13 in which each control means includes mechanism for forming right and left hand components of partial products for 1, 2 or 5 times an amount, and for entering said components into the accumulator, said operation selecting means rendering the 1, 2 or 5 multiplier effective together with the said first, second or third control means, respectively.

15. In a cyclically operable machine of the class described, an accumulator having denominationally ordered elements settable to represent an amount, cyclic testing means, operation controlling devices selectively operable under control of said testing means in accordance with the value of the highest ordered digit of said amount, column selecting means for causing said testing means to test the elements of the accumulator in successive order, one element for each cycle of operation, means controlled by the testing means when a tested element represents a zero for readjusting the testing means to test the next adjacent element during the same cycle, and means controlled by the testing means when both elements tested in a single cycle represent zero for adjusting the column selecting devices to cause testing of a still lower ordered element during the succeeding cycle.

16. In a cyclically operable machine of the class described, an accumulator having denominationally ordered elements settable to represent a multiplier or a dividend amount, a device settable to represent a divisor, a testing device including column selecting means, said machine being conditionable for multiplying and dividing operations, cyclic means controlled when multiplying operations are effective for causing said testing means to successively test the ordered elements of the accumulator beginning with the highest, irrespective of whether it contains an entry or not, and means effective when dividing operations are effective and controlled by the divisor device for adjusting the column selecting means to cause the testing means to test the ordered elements in succession beginning with the order containing the highest significant digit of the dividend.

17. In a cyclically operable machine of the class described, in which each cycle has an entering period and a tens carry period and having an electrically controlled accumulator, means for effecting additive and subtractive entries therein during the entering period of a cycle, which may result in a positive or negative balance, a tens carry circuit effective each cycle during said tens carry period following an entry period therein, for effecting tens carries between denominational orders, a balance representing relay, means controlled by the accumulator and including said tens carry circuit for energizing said balance relay prior to the entry of carry units, when the prior entry is such as to change the balance from a positive to a negative one.

18. In a machine of the class described, a device settable to represent an amount, an impulse emitter for emitting a single series of electrical impulses, one impulse for each of the digits 1 to 9, a cyclically operable accumulator responsive to electrical impulses, said emitter being arranged to emit a single series of impulses for each cycle of operation of the accumulator, circuit connections between the emitter and the accumulator extending through said amount device, a multiplying relay, and means controlled thereby and by said device and effective during a single cycle of the accumulator for selecting from said single series of impulses, impulses representative of the right hand components of 2 times the amount and then impulses representative of the left hand components of 2 times the amount for controlling said accumulator, and column shift means effective intermediate the transmission of right and left hand component impulses for shifting the denominational allocation thereof.

19. In a machine of the class described, a device settable to represent an amount, an impulse emitter for emitting a single series of electrical impulses, one impulse for each of the digits 1 to 9, a cyclically operable accumulator responsive to electrical impulses, said emitter being arranged to emit a single series of impulses for each cycle of operation of the accumulator, circuit connections between the emitter and the accumulator extending through said amount device, a multiplying relay, and means controlled thereby and by said device and effective during a single cycle of the accumulator for selecting from said single series of impulses, impulses representative of the right hand components of 5 times the amount and then impulses representative of the left hand components of 5 times the amount for controlling said accumulator, and column shift means effective intermediate the transmission of right and left hand component impulses for shifting the denominational allocation thereof.

20. In a machine of the class described, a device settable to represent an amount, an impulse emitter for emitting a single series of electrical impulses, one impulse for each of the digits 1 to 9, a cyclically operable accumulator responsive to electrical impulses, said emitter being arranged to emit a single series of impulses for each cycle of operation of the accumulator, circuit connections between the emitter and the accumulator extending through said amount device, a multiplying relay, and means controlled thereby and by said device and effective during a single cycle of the accumulator for selecting from said single series of impulses, impulses representative of the right and left hand components of 2 times the amount and transmitting first one and then the other component to the accumulator, and column shift means effective intermediate the component transmission for shifting the denominational allocation of the later impulses.

21. In a machine of the class described, an accumulator having denominationally ordered elements settable to represent a multiplier and conditionable for additive or subtractive operation, means for representing the algebraic sign of said multiplier, means for repeatedly selecting and testing the element containing the highest ordered digit of the multiplier and for causing algebraic addition of one of a predetermined number of values to the digit tested, the value selected, and whether it is to be added or subtracted, being determined by the value of the digit tested and its sign, and means for interrupting further testing when the multiplier has been reduced to zero.

SAMUEL BRAND.
FRANCIS V. ADAMS.

REFERENCES CITED

The following references are of record in the file of this patent:

UNITED STATES PATENTS

| Number | Name | Date |
|---|---|---|
| 2,199,537 | Campbell | May 7, 1940 |
| 2,239,524 | Johnstone et al. | Apr. 22, 1941 |
| 2,309,240 | Chase | Jan. 26, 1943 |
| 2,328,623 | Dickinson | Sept. 7, 1943 |
| 2,344,885 | Kozma et al. | Mar. 21, 1944 |
| 2,364,540 | Luhn | Dec. 5, 1944 |
| 2,403,480 | Clary et al. | July 9, 1946 |
| 2,467,419 | Avery | Apr. 19, 1949 |

FOREIGN PATENTS

| Number | Country | Date |
|---|---|---|
| 484,150 | Great Britain | Oct. 28, 1935 |